US012683793B1

(12) United States Patent
Stapleton

(10) Patent No.: US 12,683,793 B1
(45) Date of Patent: Jul. 14, 2026

(54) SYSTEMS AND METHODS FOR AUTHENTICATION USING A CRYPTOGRAPHIC ONE-TIME PASSCODE

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 450 days.

(21) Appl. No.: 18/049,161

(22) Filed: Oct. 24, 2022

(51) Int. Cl.
H04L 9/32 (2006.01)

(52) U.S. Cl.
CPC .......... H04L 9/3228 (2013.01); H04L 9/3213 (2013.01)

(58) Field of Classification Search
CPC ....... H04L 63/08; H04L 63/083; H04L 63/10; H04L 9/3247; H04L 63/0823; H04L 9/0825; H04L 9/3228; H04L 9/3213; G06F 21/31; G06F 21/03
See application file for complete search history.

(56) References Cited

U.S. PATENT DOCUMENTS

| | | | |
|---|---|---|---|
| 9,374,369 B2 | 6/2016 | Mahaffey et al. | |
| 10,333,914 B2 | 6/2019 | Mezei et al. | |
| 10,496,810 B2 | 12/2019 | Lewis et al. | |
| 2014/0250499 A1* | 9/2014 | Vercruysse | ......... H04L 63/0838 |
| | | | 726/4 |
| 2016/0036808 A1* | 2/2016 | Li | ........................ H04L 63/0442 |
| | | | 726/6 |
| 2016/0156598 A1* | 6/2016 | Alonso Cebrian | ......................... |
| | | | H04L 63/0861 |
| | | | 713/168 |
| 2016/0335636 A1 | 11/2016 | Shao | |
| 2020/0036527 A1 | 1/2020 | Girdhar et al. | |
| 2021/0004454 A1* | 1/2021 | Chester | ................. H04L 9/3213 |
| 2021/0273813 A1* | 9/2021 | Landman | .............. H04L 9/3247 |

OTHER PUBLICATIONS

Symantec VIP—Two Factor Authentication Anywhere, https://vip.symantec.com, Apr. 15, 2022.

* cited by examiner

*Primary Examiner* — Beemnet W Dada
*Assistant Examiner* — Sayeda Salma Nahar
(74) *Attorney, Agent, or Firm* — K&L Gates LLP

(57) ABSTRACT

Systems, apparatuses, methods, and computer program products are disclosed for authentication using a cryptographic one-time passcode (COTP). An example method includes receiving, via a first channel, a first authentication response associated with a user, and verifying the first authentication response based on stored data associated with the user. The example method also includes generating, in response to a successful verification of the first authentication response, a COTP token, wherein the COTP token is digitally signed with a first digital signature associated with the verification system. The example method also includes causing transmission, via a second channel, of an authentication request comprising the COTP token, and receiving, via the second channel, a second authentication response comprising an candidate COTP token. The example method further includes verifying the second authentication response.

21 Claims, 11 Drawing Sheets

SYSTEMS AND METHODS FOR AUTHENTICATION USING A CRYPTOGRAPHIC ONE-TIME PASSCODE

TECHNOLOGICAL FIELD

Example embodiments of the present disclosure relate generally to cryptography and, more particularly, to systems and methods for cryptographic one time passcodes (COTPs).

BACKGROUND

Multi-factor authentication (MFA), such as two-factor authentication (2FA), may describe various authentication techniques which may require a user to provide two or more verification factors in order to perform one or more actions, thereby providing an additional layer of security. One time passwords/passcodes (OTPs) frequently serve as one of the two or more verification factors. Legacy MFA protocols which use OTPs typically require a user to manually enter the OTP, which may be a randomly generated string of characters valid only during a particular session or time period, into a designated user input interface.

BRIEF SUMMARY

As described above, OTPs are typically relied upon as a second, independent factor in 2FA or MFA. The single-use nature (and sometimes timebound nature) of OTPs may make them resistant to replay attacks, and may also provide an additional layer of protection for a user with multiple accounts using the same or similar passwords. However, such existing authentication processes which utilize OTPs exhibit various security issues. In particular, because legacy protocols expose the OTP to the user, such legacy protocols are vulnerable to the OTP being intercepted or rerouted by bad actors. Common OTP attacks include short message service (SMS) code captures, subscriber identity module (SIM) swapping, email hacking, etc. Furthermore, because users are required to manually enter OTPs into authentication pages, this makes OTPS further susceptible to phishing scams. These security concerns are amplified in high volume authentication systems designed to authenticate multiple users between multiple computing devices, such as multiple server devices and multiple user devices, at any given time.

Additionally, simplistic OTP generation algorithms may be cracked such that OTPs may be derived. Typically, such OTPs are generated by such algorithms based on a seed (e.g., a shared key) and a moving factor. The moving factor may be based on whether the OTP is configured to be a time-based OTP (TOTP) or a hash-based message authentication code-based OTP (HOTP).

For HOTP generation, the moving factor is event-driven and determined based on a counter, which is incremented with each event. HOTPs are much more susceptible to various types of attacks because they are valid for longer time periods than TOTPs. Additionally, since HOTPs use a counter-based, there is an associated risk that a server and the OTP token may desynchronize (e.g., a user has pressed a button too many times). To overcome this, certain authentication systems allow the server to accept previous and subsequent OTPs, thereby increasing the likelihood that a bad actor may be successful in a brute force his/her way into a user account.

For TOTP generation, the moving factor is based on a time counter configured with a time step (e.g., 180 seconds).

While TOTPs are generally considered more secure than HOTPs, they are still susceptible to real-time phishing scams and man-in-the-middle traffic sniffing. Additionally, TOTP algorithms require the use of a shared secret, which cannot be provided as a hash or cryptographic salt. As such, authentication systems which use TOTP generation may store shared secrets in plaintext on associated servers. In the event shared secrets were accessed by bad actors, they may be able to derive the TOTPs without alerting users.

Additionally, in a circumstance in which a user engages an authentication process using a mobile phone via a mobile app or browser, the user may access an OTP (e.g., after logging in with a username and password) via email or text message using the very same mobile phone, substantially weakening the independence of the OTP as a second authentication factor. Thus, while the communication channels (e.g., a mobile app and email) may be independent, the device is not, such that a fraudster cannot be prevented from misusing the device if stolen.

In addition to demonstrating security vulnerabilities, existing authentication processes also intrude on user experience. For instance, a user's workflow may be interrupted by a prompt to manually enter an OTP, shifting the user's focus away from a task at hand and forcing the user to briefly memorize the OTP. Users having to read the OTP on a display of one device and enter the OTP on another device may lead to transposing or mistyping characters. Existing authentication processes that incorporate a time-to-live (TTL) with the OTP may place pressure on a user to complete the task within the allocated time, causing entry errors and increasing anxiety of the user. Existing authentication processes that require a user to read the OTP on a display of one device and enter the OTP on another device are problematic in circumstances involving poor inside lighting conditions, bright outside lighting conditions, or weak eyesight. Further, these existing authentication processes may agitate users when the second device is in another room or its location is unknown, causing timeouts.

Systems, apparatuses, methods, and computer program products are disclosed herein for cryptographic one-time passcode (COTP) authentication. COTP authentication may comprise a dual-channel OTP process which may be used for in MFA and/or 2FA authentication systems. COTP authentication may allow for a confirm-and-click process, thereby avoiding forcing a user to manually enter OTP characters. COTP authentication may include a first authentication factor (e.g., verification of a user based on a provided user identifier and user authentication information, such as a password), and a second "confirm-and-click" authentication factor using cryptographic methods. As further detailed herein, example embodiments improve upon existing authentication methods by utilizing dual channels which provide independence to both first and second authentication factors. In doing so, various embodiments of the present invention address the security vulnerabilities associated with 2FA systems using legacy OTP generation and additionally, provide for a more streamlined and pleasant user experience In one example embodiment, a method is provided for authentication using a COTP. The method includes receiving, by communications hardware of a verification system and via a first channel, a first authentication response associated with a user. The method further includes, performing, by verification circuitry of the verification system, one or more first verification operations on the first authentication response. The method further includes generating, by token generation circuitry of the verification system and in response to verification of the first authentication response, a cryptographic one-time-passcode (COTP) token, wherein the COTP token is digitally signed with a first digital signature associated with the verification system. The method further includes providing, by the communications hardware and via a second channel, an authentication request comprising the COTP token. The method further includes receiving, by the communications hardware and via the second channel, a second authentication response comprising a candidate COTP token. The method further includes performing, by the verification circuitry, one or more second verification operations on the second authentication response based on the received candidate COTP token In another example embodiment, an apparatus is provided for authentication using a COTP. The apparatus includes communications hardware configured to receive, via a first channel, a first authentication response associated with a user. The communications hardware may further be configured to provide, via a second channel, an authentication request comprising a COTP token. The communications hardware may further be configured to receive, via the second channel, a second authentication response comprising a candidate COTP token. The apparatus may further include verification circuitry configured to perform one or more first verification operations on the first authentication response. The verification circuitry may further be configured to perform one or more second verification operations on the second authentication response based on the received candidate COTP token. The apparatus may further include token generation circuitry configured to generate, in response to verification of the first authentication response, the cryptographic one-time-passcode (COTP) token, wherein the COTP token is digitally signed with a first digital signature associated with the verification system.

In another example embodiment, a computer program product is provided for authentication using a COTP. The computer program product comprises at least one non-transitory computer-readable storage medium storing software instructions that, when executed, cause an apparatus to receive, via a first channel, a first authentication response associated with a user. The at least one non-transitory computer-readable storage medium storing software instructions may further cause the apparatus to perform one or more first verification operations on the first authentication response. The at least one non-transitory computer-readable storage medium storing software instructions may further cause the apparatus to generate, in response to verification of the first authentication response, a cryptographic one-time-passcode (COTP) token, wherein the COTP token is digitally signed with a first digital signature associated with a verification system. The at least one non-transitory computer-readable storage medium storing software instructions may further cause the apparatus to provide, via a second channel, an authentication request comprising the COTP token. The at least one non-transitory computer-readable storage medium storing software instructions may further cause the apparatus to receive, via the second channel, a second authentication response comprising a candidate COTP token, wherein the COTP token is digitally signed with a first digital signature associated with the verification system. The at least one non-transitory computer-readable storage medium storing software instructions may further cause the apparatus to perform one or more second verification operations on the second authentication response based on the received candidate COTP token.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
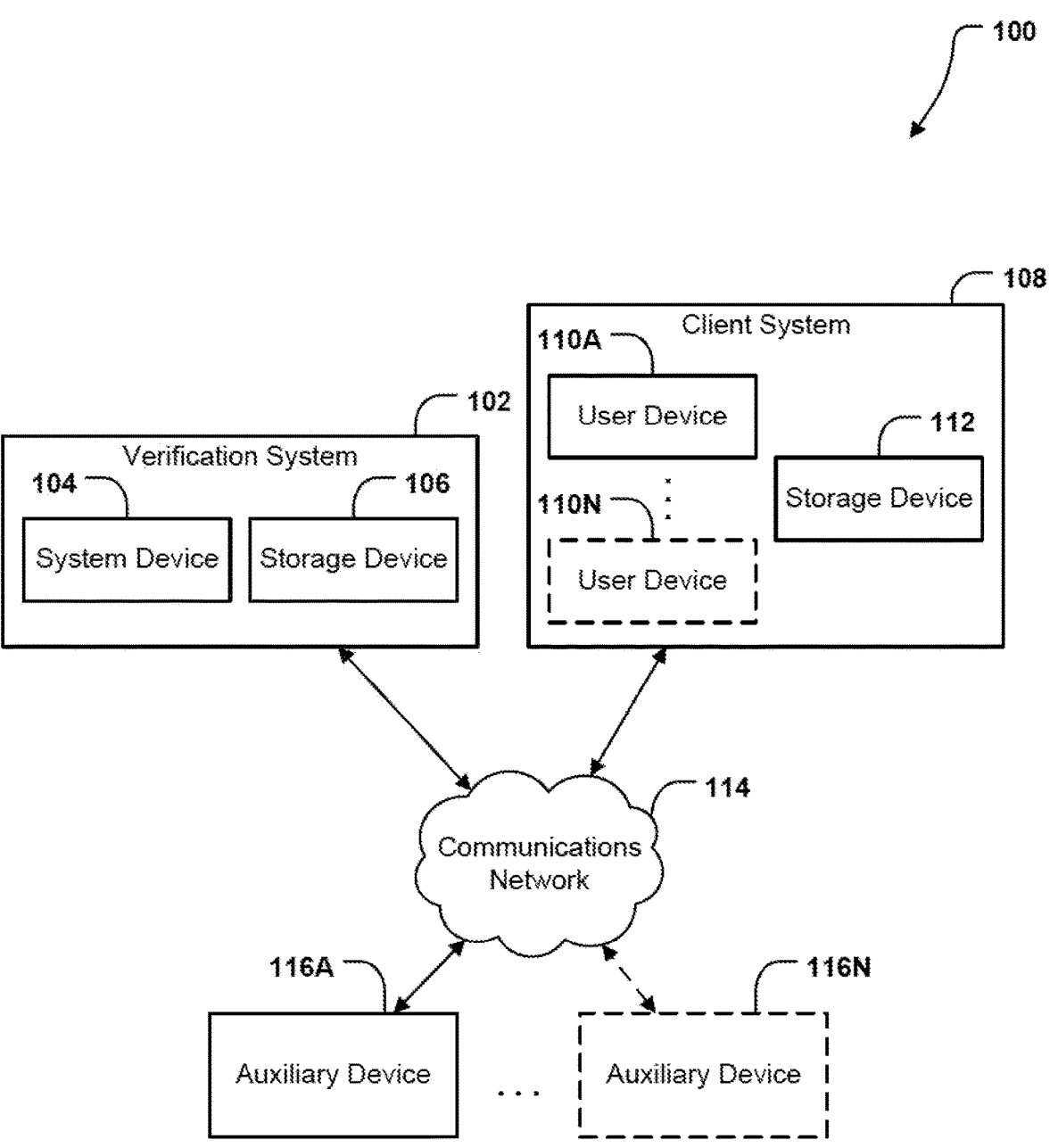
FIG. 1 illustrates a COTP authentication system in which some example embodiments may be used for authentication using a COTP.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

The word "example" is used herein to mean "serving as an example, instance, or illustration." Any implementation described herein as "example" is not necessarily to be construed as preferred or advantageous over other implementations.

The term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The terms "server" or "server device" may be used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The terms "client device," "mobile device," "electronic device." "user device" and the like refer to computer hardware associated with the client system that is configured (either physically or by the execution of software) to access a first channel and/or second channel of a communication system and, among various other functions, is configured to directly, or indirectly, transmit and receive data. In some embodiments, the user device may be configured to generate and/or provide a user action request to a verification device. In some embodiments, the user device may receive a confirmation acceptance or denial from a verification device, indicating whether to perform the one or more actions described by the user action request. In some embodiments, the user device may additionally or alternatively be configured to generate and/or provide the first authentication response to a verification device. The user device may further be configured to generate and/or provide the second authentication response to the system device. The user device may further be configured to verify the COTP token as received from the system device and digitally sign the COTP token to generate a digitally signed COTP token (e.g., a candidate COTP token). Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. In some embodiments, the user device may support a Trusted Execution Environment (TEE) that uses hardware-based secure elements. Additionally or alternatively, the user device may support a Trusted Platform Module (TPM) with a dedicated microcontroller for a secure crypto-processor. The user device may be configured with a client system pair of asymmetric cryptographic keys, including a public key and a private key.

The terms "system device." "verification system device," and the like refer to computer hardware associated with the verification system that is configured (either physically or by the execution of software) to access a first channel and/or second channel of a communication system and, among various other functions, is configured to directly, or indirectly, transmit and receive data. In some embodiments, the system device may be configured to generate and/or provide a COTP token to a user device. The system device may further be configured to verify the first authentication response and second authentication response. Example system devices may include a smartphone, a tablet computer, a laptop computer, a wearable device (e.g., smart glasses, smart watch, or the like), and the like. In some embodiments, a system device may include a "smart device" that is equipped with a chip or other electronic device that is configured to communicate with the apparatus via Bluetooth, NFC, Wi-Fi, 3G, 4G, 5G, RFID protocols, and the like. In some embodiments, the system device may act as a server device. The system device may be configured with a verification system pair of asymmetric cryptographic keys, including a public key and a private key.

The term "auxiliary device" and the like refer to computer hardware which is not directly associated with the verification system or client system that is configured (either physically or by the execution of software) to access a first channel and/or second channel of a communication system and, among various other functions, is configured to directly, or indirectly, transmit and receive data. In some embodiments, the auxiliary device may be configured to generate and/or provide a user action request to a verification device. In some embodiments, the auxiliary device may receive a confirmation acceptance or denial from a verification device, indicating whether to perform the one or more actions described by the user action request. In some embodiments, the auxiliary device may additionally or alternatively be configured to generate and/or provide the first authentication response to a verification device. Example auxiliary devices may include a smartphone, a tablet computer, a laptop computer, a wearable device (e.g., smart glasses, smart watch, or the like), cameras, business terminals, and the like. In some embodiments, an auxiliary device may include a "smart device" that is equipped with a chip or other electronic device that is configured to communicate with the apparatus via Bluetooth, NFC, Wi-Fi, 3G, 4G, 5G, RFID protocols, and the like. In some embodiments, the auxiliary device may support Trusted Execution Environment (TEE) that uses hardware-based secure elements. Additionally or alternatively, the auxiliary device may support Trusted Platform Module (TPM) with a dedicated microcontroller for a secure crypto-processor. The auxiliary device may be configured with an auxiliary system pair of asymmetric cryptographic keys, including a public key and a private key.

The terms "first channel", "first verification channel", or the like may refer to a communications channel established between two or more devices. In some embodiments, the first channel may be established between a user device and a verification system device. Alternatively, the first channel may be established between a user device and a verification system device. The first channel may be used by either the user device or auxiliary device to provide a first authentication response to a system verification device. The provision of data across the first channel may be performed in any suitable fashion and may be dependent upon the type of communication channel. The particular protocols and rules for providing data across the first channel may be dependent upon the type of communication channel.

The terms "second channel", "second verification channel", or the like may refer to a communications channel established between two or more devices. The second channel may be independent of the first channel. In some embodiments, the first channel and second channel correspond to different types of communication channels. In some embodiments, the second channel may be established between a user device and a verification system device. In some embodiments, the second channel may be established between the same user device and the verification system device as the first channel. The second channel may be used by the verification system device to provide an authentication request. The second channel may also be used by either the user device or auxiliary device to provide the second authentication response to the system verification device. The provision of data across the first channel may be performed in any suitable fashion and may be dependent upon the type of communication channel. The particular protocols and rules for providing data across the first channel may be dependent upon the type of communication channel.

The term "user action request" may refer a data structure configured to describe one or more requested actions to be performed with respect to the user. The user action request may be provided by a user device or auxiliary device to a verification system device over a first channel or an alternative channel. In some embodiments, the user action request may be included within the first authentication response.

The term "first authentication response" may refer to a data structure configured to describe information pertaining to a user associated with the first authentication response. The first authentication response may be provided by a user device or auxiliary device to a verification system device over a first channel. In some embodiments, the information/data included in the first authentication response may be used by one or more verification system devices to identify the user. The user may be identified from within a user database based on the information in the first authentication response. Additionally, the information/data may include user authentication information, which may be used to verify the user. In some embodiments, the first authentication response may include a user identifier and a static password (e.g., user authentication information) associated with the user identifier. In some embodiments, the first authentication response may include information associated with the user. For example, the first authentication response may include information pertaining to one or more financial accounts associated with the user (e.g., account number, debit card number, and/or the like).

The term "first verification operations" may refer to a set of operations performed by one or more verification system devices on the first authentication response in an attempt to verify the first authentication response. In some embodiments, the first verification operations may include determining a user identifier, accessing the stored authentication information associated with the user identifier, comparing the received user authentication information described in the first authentication response with the user authentication information stored in the verification system, and determining whether to verify the first authentication response based on whether the provided user authentication information matches stored user authentication information. In some embodiments, the stored user information may be stored using a hash function and hash table such that sensitive user information is protected. As such, in order to compare the provided user authentication information matches stored user authentication information, the user authentication information may serve as the key and may be provided to the hash function, which may combine the user authentication with a salt value to derive candidate hash-based authentication information. The candidate hash-based authentication information may be compared to the stored authentication information entry. If the candidate hash-based authentication information is determined to match the stored authentication information entry, the first authentication response may be verified. If the candidate hash-based authentication information is not determined to match the stored authentication information entry, the first authentication response is not verified. In some embodiments, the first authentication response is not verified, a first verification operation may further include generating a first authentication failure alert indicative of this failure. The first authentication failure alert may be provided to one or more user devices, auxiliary devices, and/or verification system devices.

The term "authentication request" may refer to a data structure configured to include a COTP token. The second authentication response may be provided by a verification system device to a user device or auxiliary device over a second channel. In some embodiments.

The term "second authentication response" may refer to a data structure configured to describe a candidate COTP token. The second authentication response may be provided by a user device or auxiliary device to a verification system device over a second channel. candidate COTP token. The second authentication response may be provided by a user device or auxiliary device to a verification system device over a second channel.

The term "COTP token" may refer to a data structure configured to describe a data structure generated by the verification system using cryptographic methods and is configured to serve together with the candidate COTP token to act as an OTP. In some embodiments, the COTP token may comprise a COTP token header, a COTP token payload, and one or more COTP token signatures. The COTP token header may be indicative of the cryptographic algorithm used to generate the COTP token and the type of token. The COTP token payload may be indicative of at least indicative of one or more of the one or more requested actions. In some embodiments, the COTP token may additionally include time-to-live (TTL) parameters. In particular, the TTL parameters may include a first time-to-live (TTL) parameter and a second TTL parameter. The first TTL parameter may describe a user time window value in which a user may interact with the COTP token. The second TTL parameter may describes a COTP time window value in which the corresponding candidate COTP token is valid. In some embodiments, the COTP token further includes a randomizer value (e.g., timestamp, nonce value, etc.) such that the token and token signature are unique per token.

The COTP token may include a first digital signature. The first digital signature may be generated using one or more cryptographic algorithms. In some embodiments, the first digital signature may be generated using digital signature algorithms such as Rivest-Shamir-Adleman algorithm (RSA), digital signature algorithm (DSA), or elliptic curve digital signature algorithm (ECDSA). The first digital signature may also be generated using post-quantum cryptography (PQC) algorithms. The first digital signature may also be generated using symmetric based algorithms, such as a hash-based message authentication (HMAC) algorithm. In some embodiments, the COTP token payload or the COTP token itself may be encrypted using one or more encryption algorithms, such as advanced encryption standard (AES). The encryption key may be unique for each token and may be pre-shared and/or dynamically allocated to a user device and/or auxiliary device. In some embodiments, the COTP token may be stored on a distributed ledger and/or on a blockchain.

The term "candidate COTP token" may refer to a data structure configured to describe a data structure generated by the user device using cryptographic methods and is configured to serve together with the COTP token to act as an OTP. In some embodiments, the candidate COTP token may comprise a candidate COTP token header, a candidate COTP token payload, and one or more candidate COTP token signatures. The candidate COTP token may be generated based on a user response to the authentication request. For example, if the user selects a user input which confirms the authentication request, the user device or auxiliary device may sign the COTP token with a second digital signature using the corresponding user device or auxiliary system device pair of asymmetric cryptographic keys and used as the candidate COTP token. In some embodiments, the COTP token may only be signed in an instance the first TTL parameter is still valid. Said otherwise, the COTP token may only be signed during a predefined time period as defined by the first TTL parameter value.

The candidate COTP token may include a first digital signature and second digital signature. The first digital signature may be the same first digital signature as defined in the COTP token. The second digital signature may be generated using one or more cryptographic algorithms. In some embodiments, the second digital signature may be generated using digital signature algorithms such as RSA, DSA, ECDSA. The second digital signature may also be generated using PQC algorithms. The second digital signature may also be generated using symmetric based algorithms, such as a HMAC algorithm. In some embodiments, the candidate COTP token payload or the candidate COTP token itself may be encrypted using one or more encryption algorithms, such as AES, using a pre-shared and/or dynamically allocated encryption key.

The term "second verification operations" may refer to a set of operations performed by one or more verification system devices on the second authentication response in an attempt to verify the second authentication response. In some embodiments, the second verification operations may include verifying a first digital signature of the COTP token and a second digital signature of the candidate COTP token. The first digital signature may be verified by determining whether the first digital signature of the candidate COTP token corresponds to the first digital signature associated with the verification system. The second digital signature may be verified by determining whether the second digital signature of the candidate COTP token corresponds to the second digital signature associated with the client system.

In order to compare the first digital signature of the candidate COTP token corresponds to the first digital signature associated with the computing device, the public key of the verification system may be accessed and used to convert the first digital signature of the candidate COTP token to a numerical representation. The numerical representation of the first COTP digital signature may be compared to the verification system public key certificate to verify the second COTP digital signature. If the numerical representations match, the first digital signature is verified.

In order to compare the second digital signature of the candidate COTP token corresponds to the second digital signature associated with the computing device, the public key of the respective computing device (e.g., the public key of the user device pair of asymmetric keys or public key of the auxiliary pair of asymmetric keys) may be accessed and used to convert the second digital signature of the candidate COTP token to a numerical representation. The numerical representation of the second COTP digital signature may be compared to the computing device public key certificate to verify the second COTP digital signature. If the numerical representations match, the second digital signature is verified.

Overview

As noted above, methods, apparatuses, systems, and computer program products are described herein that provide for dual-channel OTP authentication with independence between a first and second authentication factor. Traditionally, regardless of the OTP generation method, the provision of an OTP to a user in plaintext form makes the legacy OTP authentication system vulnerable to interception, rerouting, and phishing.

Some authentication systems have sought to minimize this risk by providing the OTP (e.g., second authentication factor) via a second channel (e.g., different than a first channel which received the first authentication factor). However, such systems still require the user to manually enter the OTP value into an application that provides the manually entered OTP over the first channel. The first channel and second channel may either associated with two different devices or the same device. For example, a user may provide his/her password to login to an online account in an online browser via a first user device and receive an OTP in an SMS message, which may be accessed via the first user device or a second user device (e.g., the first user device is a laptop, and the second user device is a cellphone). In the instance the channels are associated with the same device, the authentication system is vulnerable to a fraudster stealing the device. Alternatively, if the channels are each associated with different device, this leads to user frustration as the second device may not be nearby or accessible, and therefore lead to timeouts (e.g., with TOTPs) and/or increased chance for interception (e.g., with HOTPs). Regardless of whether multiple devices are used, users are still required to manually enter an OTP value.

In contrast to these conventional techniques for OTP authentication, example embodiments described herein provide authentication using a COTP token with independence between the first and second authentication channels. In some embodiments, a verification system device may receive an authentication response over a first channel, perform one or more first verification operations on the authentication response, and in response to successful verification, generate a COTP token to transmit via a second channel to a client device. The COTP token may be digitally signed (e.g., using a pair of asymmetric cryptographic keys associated with the verification system) by the verification system device to identify the verification system. In some embodiments, the user device (or an auxiliary device) may verify the authenticity of the COTP token based on the digital signature. The user device may be configured to display a confirmation prompt to the user. The confirmation prompt may be configured to accept user input, which may be indicative of user confirmation or denial regarding the associated authentication response. Based on the client response, the user device may generate a digitally signed COTP token (e.g., using a pair of asymmetric cryptographic keys associated with the user device) and provide the digitally signed COTP token (e.g., a candidate COTP token) to the verification system over the second channel. The verification system may perform a verification process to verify the second authentication response.

Accordingly, the present disclosure sets forth systems, methods, and apparatuses that provide for improved OTP authentication over dual channels. Advantageously, COTP authentication methods avoid the need to manually copy an OTP from one device to another. The simple confirmation prompt presented to a user provided upon receipt of the COTP token simplifies the user experience and alleviates frustration and accessibility problems typically associated with OTP. In addition, the digital signing of the COTP provides a secure second channel for authentication, even in cases where the device initiating the authentication request (e.g., user action request) and the device providing the candidate COTP token are the same. The use of a private key known only to the verification system to digitally sign the COTP token guarantees the validity of the verification system to the user. Similarly, the use of a private key known only to a computing device, and in some embodiments the user response may be signed or encrypted for further improved security.

Although a high-level explanation of the operations of example embodiments has been provided above, specific details regarding the configuration of such example embodiments are provided below.
System Architecture Example embodiments described herein may be implemented using any of a variety of computing devices or servers. To this end, FIG. 1 illustrates an example COTP authentication environment 100 within which various embodiments may operate. As illustrated, a verification system 102 may include a system device 104 in communication with a storage device 106. Although system device 104 and storage device 106 are described in singular form, some embodiments may utilize more than one system device 104 and/or more than one storage device 106. Additionally, some embodiments of the verification system 102 may not require a storage device 106 at all. Whatever the implementation, the verification system 102, and its constituent system device(s) 104 and/or storage device(s) 106 may receive and/or transmit information via communications network 114 (e.g., the Internet) with any number of other devices, such as one or more of user devices 110A-110N or one or more of auxiliary device 116A-116N.

Likewise, client system 108 may include one or more user devices 110A-110N, which may each be in communication with a storage device 112. Although storage device 112 is described in singular form, some embodiments may utilize more than one storage device 106. Similarly, although n user devices 110A-110N are described in plural form, some embodiments may utilize a singular user device 110A. Additionally, some embodiments of the client system 108 may not require a storage device 106 at all. Whatever the implementation, the client system 108, and its constituent user device(s) 110A-110N and/or storage device(s) 112 may receive and/or transmit information via communications network 114 (e.g., the Internet) with any number of other devices, such as one or more of system device(s) 104 or one or more of auxiliary devices 116A-116N.

System device 104 may be implemented as one or more servers, which may or may not be physically proximate to other components of verification system 102. Furthermore, some components of system device 104 may be physically proximate to the other components of verification system 102 while other components are not. System device 104 may receive, process, generate, and transmit data, signals, and electronic information to facilitate the operations of the verification system 102. Particular components of system device 104 are described in greater detail below with reference to apparatus 200 in connection with FIG. 2.

Storage device 106 may comprise distinct components from system device 104, or may comprise elements of system device 104 (e.g., memory 204, as described below in connection with FIG. 2). Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 114). Storage device 106 may host the software executed to operate the verification system 102. Storage device 106 may store information relied upon during operation of the verification system 102, such as various cryptographic keys that may be used by the verification system 102, data and documents to be analyzed using the verification system 102, or the like. In addition, storage device 106 may store control signals, device characteristics, and access credentials enabling interaction between the verification system 102 and client system 108 and/or one or more of the auxiliary devices 116A-116N.

User devices 110A-110N may be embodied by any computing devices known in the art, such as desktop or laptop computers, tablet devices, smartphones, or the like. The one or more user devices 110A-110N need not themselves be independent devices but may be peripheral devices communicatively coupled to other computing devices. User devices 110A-110N may receive, process, generate, and transmit data, signals, and electronic information to facilitate the operations of the client system 108. Particular components of client system 108 are described in greater detail below with reference to apparatus 300 in connection with FIG. 3.

Storage device 112 may comprise distinct components from user devices 110A-110N, or may comprise elements of user devices 110A-110N (e.g., memory 304, as described below in connection with FIG. 3). Storage device 112 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 114). Storage device 112 may host the software executed to operate the client system 108. Storage device 112 may store information relied upon during operation of the client system 108, such as various cryptographic keys that may be used by the verification system 102, data and documents to be analyzed using the client system 108, or the like. In addition, storage device 112 may store control signals, device characteristics, and access credentials enabling interaction between the client system 108 and verification system 102 and/or one or more of the auxiliary devices 116A-116N.

The one or more auxiliary devices 116A-116N may be embodied by any computing devices known in the art, such as desktop or laptop computers, tablet devices, smartphones, cameras, business terminals, or the like. The one or more auxiliary devices 116A-116N need not themselves be independent devices but may be peripheral devices communicatively coupled to other computing devices.

Although FIG. 1 illustrates an environment and implementation in which the verification system 102 and/or client system 108 interact with one or more of auxiliary device 116A through auxiliary device 116N, in some embodiments users may directly interact with the verification system 102 and/or client system 108 (e.g., via input/output circuitry of system device 104), in which case a separate auxiliary device 116A-116N may not be utilized. Whether by way of direct interaction or via a separate auxiliary device 116A-116N, a user may communicate with, operate, control, modify, or otherwise interact with the verification system 102 and/or client system 108 to perform the various functions and achieve the various benefits described herein.

Example Verification System Implementing Apparatuses

Figure 2:
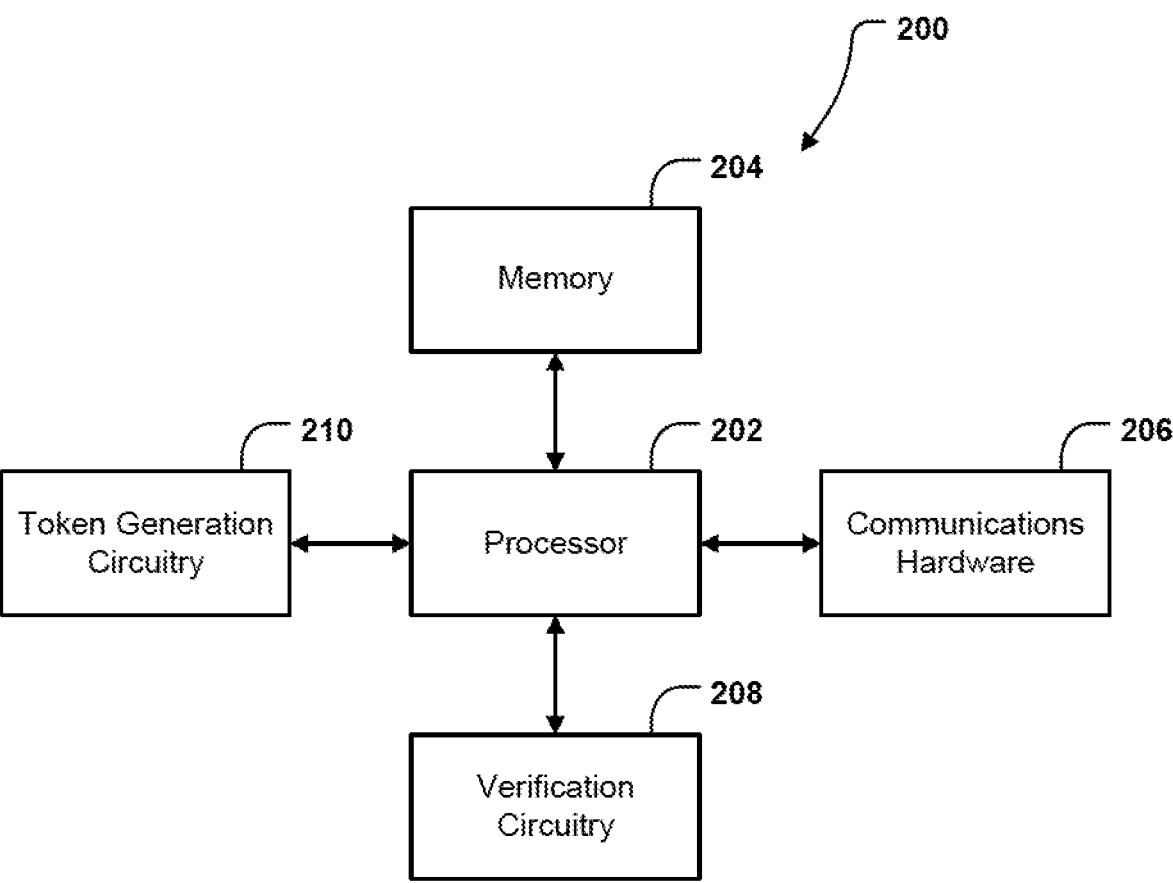
FIG. 2 illustrates a block diagram of an example verification system device that may perform various operations in accordance with some example embodiments described herein.

System device 104 of the verification system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, verification circuitry 208, and token generation circuitry 210, each of which will be described in greater detail below. While the various components are only illustrated in FIG. 2 as being connected with processor 202, it will be understood that the apparatus 200 may further comprises a bus (not expressly shown in FIG. 2) for passing information amongst any combination of the various components of the apparatus 200. The apparatus 200 may be configured to execute various operations described above in connection with FIG. 1 and below in connection with FIGS. 5A-7B.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. It will be noted that some embodiments will not include such configurations, in which case user input may be received via a separate device such as an auxiliary devices 116A-116N (shown in FIG. 1). The communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a verification circuitry 208 that verifies an authentication response of a client system. The verification circuitry 208 may utilize processor 202, memory 204, or any other hardware component included in the apparatus 200 to perform these operations, as described in connection with FIGS. 5A-7B below. The verification circuitry 208 may further utilize communications hardware 206 to gather data from a variety of sources (e.g., auxiliary device 116A through auxiliary device 116N or storage device 106, as shown in FIG. 1), may utilize communications hardware 206 to receive data from a user, and in some embodiments may utilize processor 202 and/or memory 204 to verify an authentication response.

In addition, the apparatus 200 further comprises a token generation circuitry 210 that generates a COTP token. The token generation circuitry 210 may utilize processor 202, memory 204, or any other hardware component included in the apparatus 200 to perform these operations, as described in connection with FIGS. 5A-7B below. The token generation circuitry 210 may further utilize communications hardware 206 to gather data from a variety of sources (e.g., auxiliary device 116A through auxiliary device 116N or storage device 106, as shown in FIG. 1), may utilize communications hardware 206 to receive data from a user, and in some embodiments may utilize processor 202 and/or memory 204 to generate a COTP token.

Although components 202-210 are described in part using functional language, it will be understood that the particular implementations necessarily include the use of particular hardware. It should also be understood that certain of these components 202-210 may include similar or common hardware. For example, the verification circuitry 208 and token generation circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the verification circuitry 208 and token generation circuitry 210 may leverage processor 202, memory 204, communications hardware 206, as described above, it will be understood that any of these elements of apparatus 200 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 for enabling any functions not performed by special-purpose hardware elements. In all embodiments, however, it will be understood that the verification circuitry 208 and token generation circuitry 210 are implemented via particular machinery designed for performing the functions described herein in connection with such elements of apparatus 200.

Example Client System Implementing Apparatuses

Figure 3:
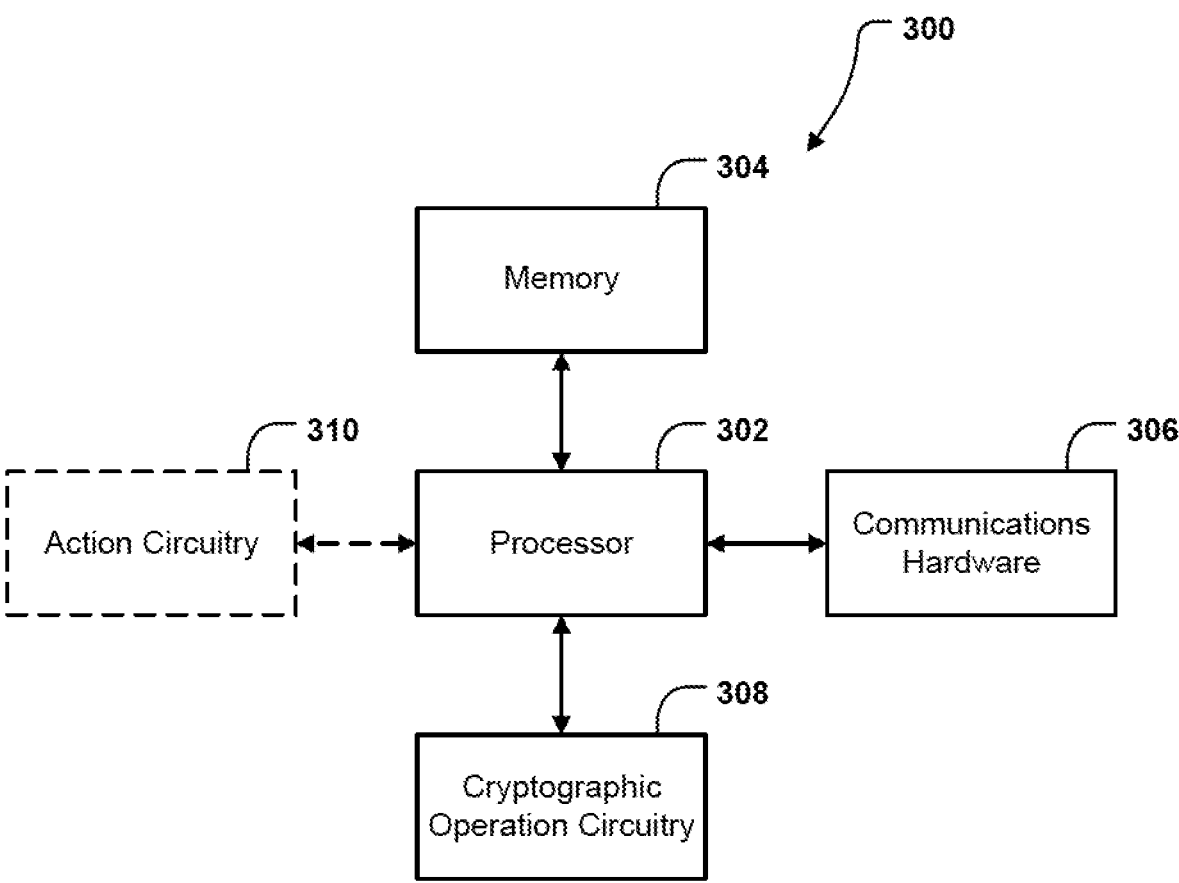
FIG. 3 illustrates a block diagram of an example user device that may perform various operations in accordance with some example embodiments described herein.

As illustrated in FIG. 3, an apparatus 300 is shown that represents an example client system 108. The apparatus 300 includes processor 302, memory 304, communications hardware 306, each of which is configured to be similar to the similarly named components described above in connection with FIG. 2. However, the apparatus 300 also includes cryptographic operation circuitry 308, which includes hardware components designed for performing operations of cryptographic primitives. The cryptographic operation circuitry 308 may utilize processor 302, memory 304, or any other hardware component included in the apparatus 300 to perform these operations, as described in connection with FIGS. 5A-7B below. The cryptographic operation circuitry 308 may further utilize communications hardware 306 to perform cryptographic operations, or may otherwise utilize processor 302 and/or memory 304 to perform cryptographic operations.

In addition, the apparatus 300 may further comprise an action circuitry 310 that performs a specified action after authentication. The action circuitry 310 may utilize processor 302, memory 304, or any other hardware component included in the apparatus 300 to perform these operations, as described in connection with FIGS. 5A-7B below. The action circuitry 310 may further utilize communications hardware 306 to gather data from a variety of sources (e.g., auxiliary device 116A through auxiliary device 116N or storage device 112, as shown in FIG. 1), may utilize communications hardware 306 to receive data from a user, and in some embodiments may utilize processor 302 and/or memory 304 to perform a specified action.

In some embodiments, various components of the apparatuses 200 and 300 may be hosted remotely (e.g., by one or more cloud servers) and thus need not physically reside on the corresponding apparatus 200 or 300. Thus, some or all of the functionality described herein may be provided by third party circuitry. For example, a given apparatus 200 or 300 may access one or more third party circuitries via any sort of networked connection that facilitates transmission of data and electronic information between the apparatus 200 or 300 and the third party circuitries. In turn, that apparatus 200 or 300 may be in remote communication with one or more of the other components describe above as comprising the apparatus 200 or 300.

As will be appreciated based on this disclosure, example embodiments contemplated herein may be implemented by an apparatus 200 or 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Example Verification System Apparatus Operations

Figure 5A:
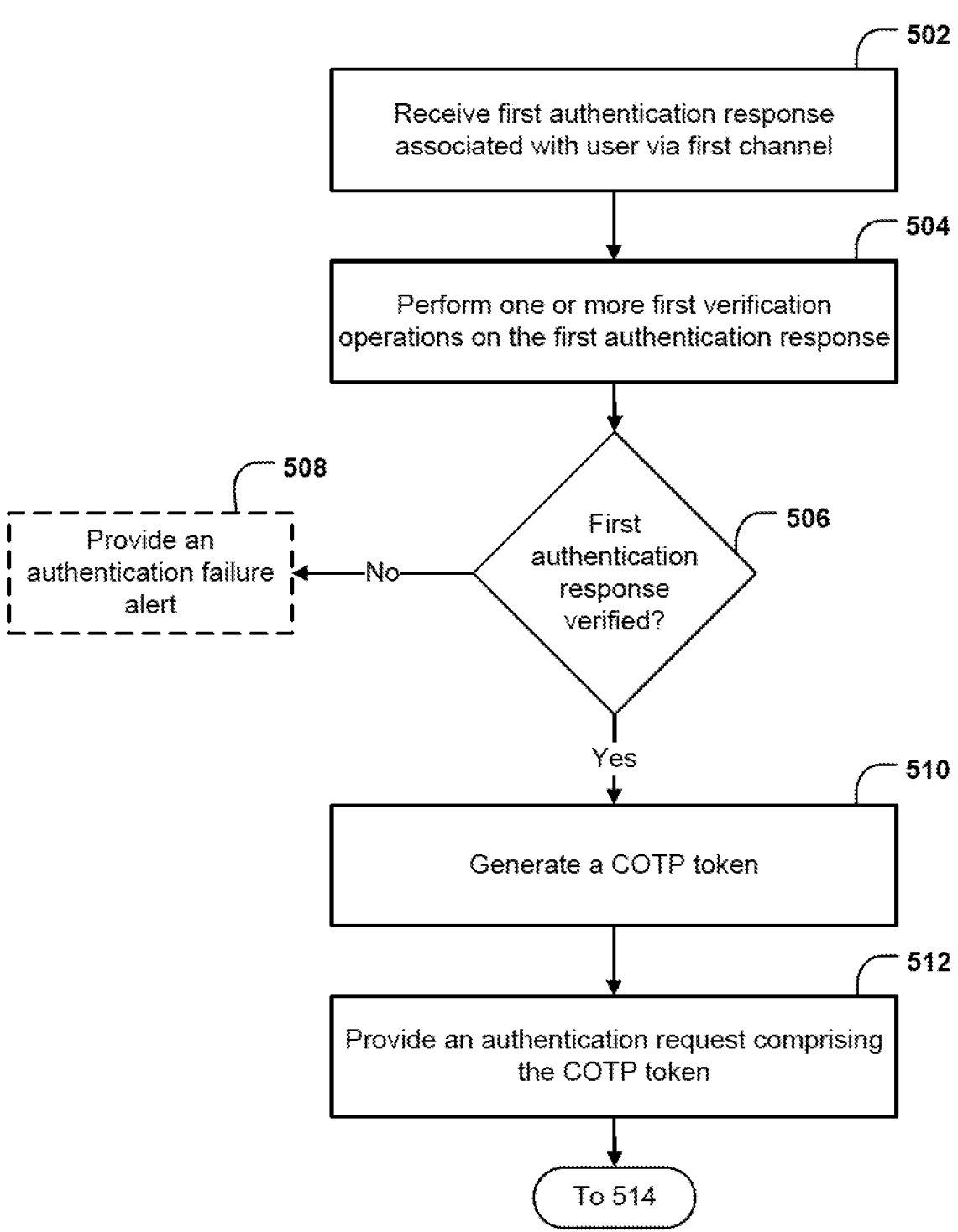
FIGS. 5A-5C illustrate example flowcharts for an authentication process using a COTP as performed by one or more verification system devices, in accordance with some example embodiments described herein.
Figure 5B:
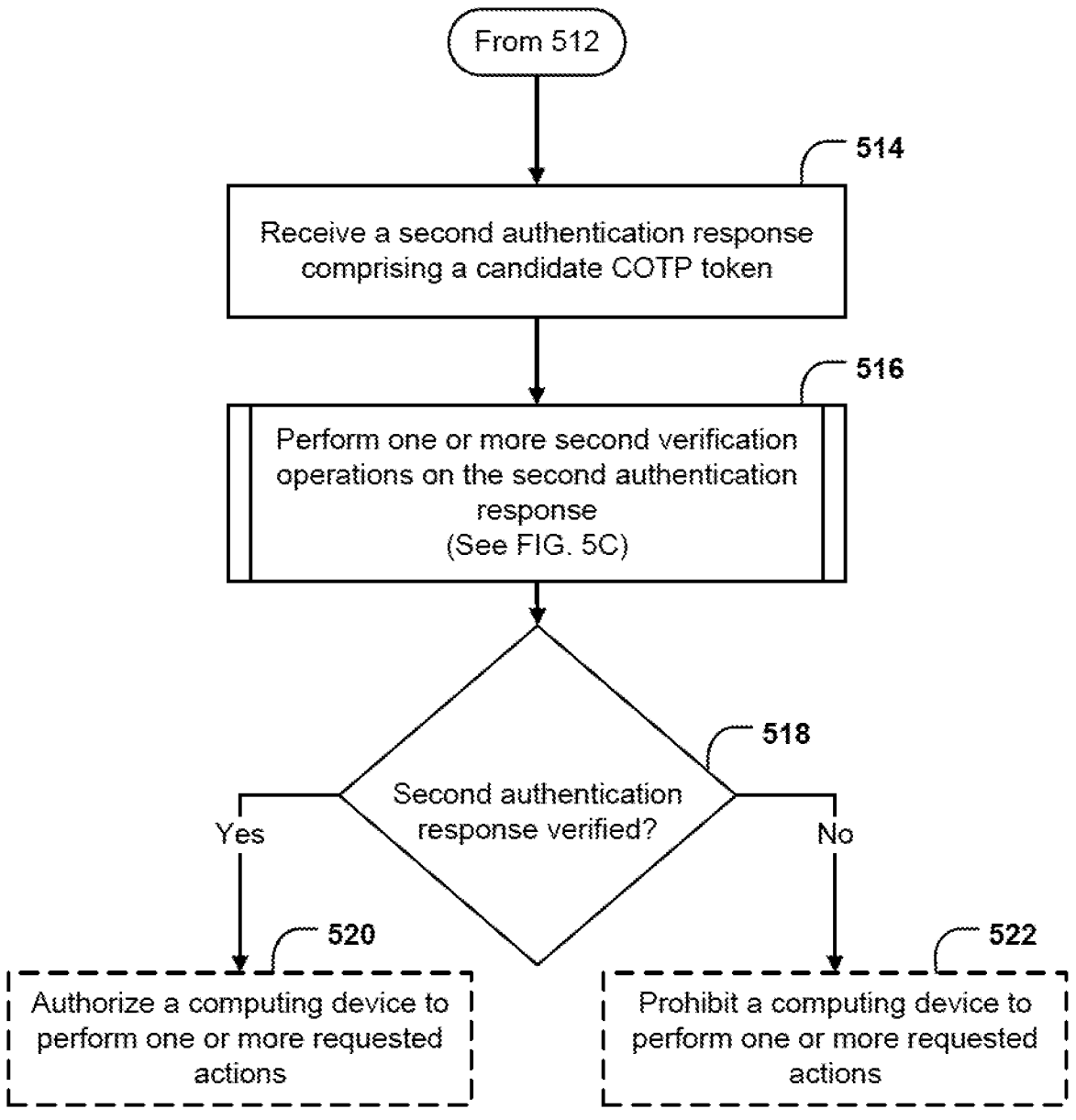
Figure 5C:
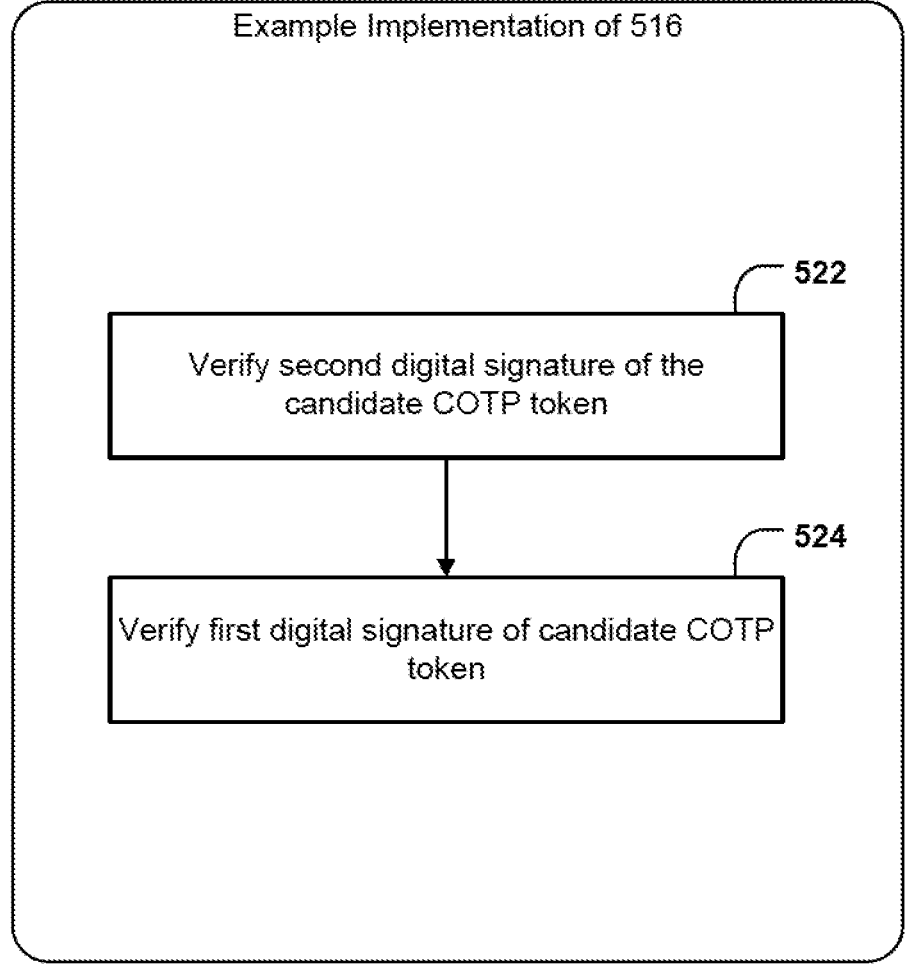

Turning to FIG. 5A-5C, example flowcharts are illustrated that contain example operations implemented by example embodiments described herein. The operations illustrated in FIGS. 5A-5C may, for example, be performed by system device 104 of the verification system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, verification circuitry 208, token generation circuitry 210, and/or any combination thereof. It will be understood that user interaction with the verification system 102 may occur directly via communications hardware 206, or may instead be facilitated by a separate auxiliary device 116A-116N, as shown in FIG. 1, and which may have similar or equivalent physical compo-nentry facilitating such user interaction.

Turning first to FIG. 5A, example operations of the apparatus 200 are shown for an COTP-based authorization. As shown by operation 502, the apparatus 200 includes means, such as processor 202, communications hardware 206, or the like, for receiving, via a first channel, a first authentication response associated with a user. In particular, the first authentication response may be received from a user device (e.g. user device 110A-110N) or an auxiliary device.

In some embodiments, the information/data included in the first authentication response may be used to identify the user. The user may be identified from within a user database based on the information in the first authentication response. Additionally, the information/data may include user authen-tication information, which may be used to verify the user. For example, the first authentication response may include a user identifier and a static password (e.g., user authentica-tion information) associated with the user identifier. As another example, the first authentication response may include a user account identifier (e.g., a financial account) and a user inputted personal identification number (PIN) associated with the financial account (e.g., user authentica-tion information). As yet another example, the first authen-tication response may include a user identifier (e.g., drivers license number, employee number, username, full name, etc.) and biometric data (e.g., user authentication informa-tion). In some embodiments, the first authentication response may include information associated with the user. For example, the first authentication response may include information pertaining to one or more financial accounts associated with the user (e.g., account number, debit card number, and/or the like).

In some example embodiments, the first authentication response may further include a user action request. In some embodiments, the user action request may describe one or more requested actions to be performed with respect to the user. For example, a user action request may indicate the user would like to execute a 200 dollar transaction. As another example, the user action request may indicate the user would like to withdraw 500 dollars from a checking account. Alternatively, the user action request may be received separately from the first authentication request. The user action request may be received from a user device 110A-110N or auxiliary device 116A-116N over a first channel or an alternative channel.

As shown by operation 504, the apparatus 200 includes means, such as processor 202, memory 204, verification circuitry 208, or the like, for performing one or more first verification operations on the first authentication response. The verification circuitry 208 may make a determination of validity of the first user authentication response based on the described user account identifier. In some embodiments, the first verification operations may include determining a user identifier, accessing the stored authentication information associated with the user identifier, comparing the received user authentication information described in the first authen-tication response with the user authentication information stored in the verification system, and determining whether to verify the first authentication response based on whether the provided user authentication information matches stored user authentication information. The stored data may be retrieved from memory 204 or other storage. Based on the determination of whether the first authentication response is verified at operation 506, the process may proceed to opera-tion 508 or 510.

In some embodiments, the stored user information may be stored using a hash function and hash table such that sensitive user information is protected. The cryptographic hash value may be a one-way function such that it is relatively easy to compute the hash value, but prohibitively difficult to work backwards. As such, in order to compare the provided user authentication information matches stored user authentication information, the user authentication information may serve as the key and may be provided to the hash function, which may combine the user authentication with a salt value to derive candidate hash-based authentica-tion information. The candidate hash-based authentication information may be compared to the stored authentication information entry.

If the candidate hash-based authentication information is not determined to match the stored authentication informa-tion entry, the first authentication response is not verified. The apparatus 200 may then proceed to operation 508. If the candidate hash-based authentication information is deter-mined to match the stored authentication information entry, the first authentication response may be verified. The appa-ratus 200 may then proceed to operation 510.

Optionally, as shown by operation 508, the apparatus 200 includes means, such as processor 202, communications hardware 206, or the like, for providing an authentication failure alert. The first authentication failure alert may be indicative of this verification failure. In some embodiments, the authentication failure alert may indicate the reason for the failure. For example, the authentication failure alert may indicate that no user account was found for the user identifier provided by the first authentication response. As another example, the authentication failure alert may indicate that the user authentication information provided by the first authentication response does not match the stored user authentication information. The first authentication failure alert may be provided to one or more user devices 110A-110N, auxiliary devices 116A-116N, and/or other verifica-tion system devices. As such one or more end users may be made aware that the information provided in the first authen-tication response was not verified such that they may try again. Alternatively, if the attempt was made by a fraudster, the user may be made aware that an authentication process was started. In some embodiments, the apparatus 200 may terminate the authentication process.

As shown by operation 510, the apparatus 200 includes means, such as processor 202, memory 204, token genera-tion circuitry 210, or the like, for generating, in response to verification of the first authentication response, a COTP token. The COTP token may be used with a candidate COTP token to act as a cryptographically secure OTP authentica-tion method. In some embodiments, the COTP token may comprise a COTP token header, a COTP token payload, and one or more COTP token signatures. The COTP token header may be indicative of the cryptographic algorithm used to generate the COTP token and the type of token. The COTP token payload may be indicative of at least indicative of one or more of the one or more requested actions. For example, the COTP token payload data may describe a type of transaction, a transaction time, a transaction location, a transaction amount, one or more associated businesses, etc.

In some embodiments, the COTP token comprises infor-mation concerning details of the one or more requested action. For example, the communications hardware 206 may receive information concerning details of a specified action from a remote auxiliary device 116A-116N or user device 110A-110N via the first channel. The specified action may be, for example, initiating a transaction, accessing secure information about an account, or the like. The information may comprise details such as the sender or recipient of the transaction, the amount of the transaction, the owner of the account involved in the specified action, or the like. The token generation circuitry 210 may add the information in plaintext to the COTP token, which may be subsequently signed and/or cryptographically secured.

In some embodiments, the COTP token may additionally include time-to-live (TTL) parameters. In particular, the TTL parameters may include a first time-to-live (TTL) parameter and a second TTL parameter. The first TTL parameter may describe a user time window value in which a user may interact with the COTP token. The second TTL parameter may describes a COTP time window value in which the corresponding candidate COTP token is valid.

The COTP token may include a first digital signature. The first digital signature may be generated using one or more cryptographic algorithms. In some embodiments, the first digital signature may be generated using digital signature algorithms such as Rivest-Shamir-Adleman algorithm (RSA), digital signature algorithm (DSA), or elliptic curve digital signature algorithm (ECDSA). The first digital signature may also be generated using post-quantum cryptography (PQC) algorithms. The first digital signature may also be generated using symmetric based algorithms, such as a hash-based message authentication (HMAC) algorithm.

In particular, the private key of the pair of asymmetric cryptographic keys associated with the verification system may be determined and/or accessed from memory (e.g., memory 204 or other storage) and used to generate the first digital signature. Since the private key is associated with the verification system 102, that signatures generated with the private key are also associated with the verification system 102. To sign a message, the token generation circuitry 210 may cause a conversion of the COTP token to a numerical representation. The token generation circuitry 210 may further use the private key and the numerical representation of the message to compute the first digital signature. The first digital signature may be attached to the COTP token such that the COTP token and the first digital signature are transmitted together.

In some embodiments, the COTP token payload or the COTP token itself may be encrypted using one or more encryption algorithms, such as advanced encryption standard (AES), such that the COTP token is cryptographically secured. The COTP token may be cryptographically secured by encrypting the COTP token with a public key or shared symmetric key. The public key may correspond to a private key known to be possessed by the client system 108, or the shared symmetric key may be shared between the verification system 102 and client system 108. The encryption may make use of a pre-determined key stored in memory 204 or other storage, may make use of a key generated by the token generation circuitry 210, or may use a key received from a remote host via communications hardware 206. The COTP token may be both encrypted and digitally signed, either by digitally signing first then encrypting, or encrypting first then digitally signing. In some embodiments, the COTP token may be stored on a distributed ledger and/or on a blockchain.

In some embodiments, the COTP token comprises a uniquely determined value such that the COTP token is unique and the first digital signature is unique. The token generation circuitry 210 may generate and/or determine a randomizer value (e.g., timestamp, nonce value, etc.) to use when constructing the COTP token. The randomizer may take the form of a number, string, or any other data type, and it may be a truly random value, pseudo-random, or generated in any other way such that the random value is unpredictable to a potential attacker. The COTP token may comprise the uniquely determined value such that when the digital signature of the COTP token is produced, the signature may account for the uniquely determined value. The digital signature may thus be uniquely determined for each COTP token.

As shown by operation 512, the apparatus 200 includes means, such as processor 202, communications hardware 206, or the like, for providing, via a second channel, an authentication request comprising the COTP token. The communications hardware 206 may provide the authentication request to a client system 108 via the second channel. In some embodiments, the first channel and second channel correspond to different types of communication channels. For example, a first channel may use a web browser and hypertext transfer protocol and a second channel may use email and a simple mail transfer protocol. In some embodiments, the second channel may be established between the same user device as the first channel. Alternatively, the second channel may be a communications channel opened to a different device than the device to which the first channel is opened. The first channel and the second channel may use distinct sessions and/or session tokens, for example establishing separate connections via transport layer security (TLS), secure shell (SSH), or another protocol. The authentication request may comprise the COTP token, along with various headers or preambles needed to transmit the COTP token to a remote host.

Continuing on to FIG. 5B, as shown by operation 514, the apparatus 200 includes means, such as processor 202, communications hardware 206, or the like, for receiving, via the second channel, a second authentication response comprising a candidate COTP token. The communications hardware 206 may receive the second authentication request from a user device 110A-110N of the client system 108 via the second channel. The second authentication may comprise the candidate COTP token, along with various headers or preambles needed to transmit the candidate COTP token to the apparatus 200. The candidate COTP token may be an authentic copy of the COTP token, copied by the client system 108 and transmitted via the second channel.

In some embodiments, the candidate COTP token is digitally signed with a second digital signature associated with the user. The second authentication response may, in some embodiments, comprise the second digital signature in addition to comprising the candidate COTP token. The second digital signature may be associated with the user and may be signed using a private key of a pair of asymmetric keys associated with the client system 108.

Similarly to the COTP token, the candidate COTP token may comprise a candidate COTP token header, a candidate COTP token payload, and one or more candidate COTP token signatures. The candidate COTP token may be generated based on a user response to the authentication request. For example, if the user selects a user input (described below with respect to FIGS. 6A-B and FIG. 4) which confirms the authentication request, the user device or auxiliary device may sign the COTP token with a second digital signature using the corresponding user device or auxiliary system device pair of asymmetric cryptographic keys and used as the candidate COTP token. In some embodiments, the COTP token may only be signed in an instance the first TTL parameter is still valid. Said otherwise, the COTP token may only be signed during a predefined time period specified by the first TTL parameter value.

The candidate COTP token may include a first digital signature and second digital signature. The first digital signature may be the same first digital signature as defined in the COTP token. In some embodiments, the candidate COTP token payload or the candidate COTP token itself may be encrypted such that the apparatus 200 may need to decrypt the second authentication response prior to further processing. The token generation circuitry 210 may be used to decrypt any encrypted candidate COTP token information using a private key or shared symmetric key.

As shown by operation 516, the apparatus 200 includes means, such as token generation circuitry 210, or the like, for performing one or more second verification operations on the second authentication response. The token generation circuitry 210 may verify the second authentication response by confirming if the candidate COTP token is a genuine copy of the COTP token. If the candidate COTP token is not a genuine copy of the COTP token, the token generation circuitry 210 may not verify the second authentication response. If the second authentication response is not verified, the apparatus 200 may terminate the authentication process.

In some embodiments, operation 516 may be performed in accordance with the operations described in FIG. 5C. It will be appreciated by one of skill in the art that the operations described in FIG. 5C do not need to be performed in the particular order they are shown.

Turning to FIG. 5C, optionally, as shown by operation 522, the apparatus 200 may include means, such as processor 202, memory 204, token generation circuitry 210, or the like, for verifying the second digital signature of the candidate COTP token. In embodiments where the second authentication response comprises a second digital signature, the token generation circuitry 210 may further verify the second digital signature of the candidate COTP token. The second digital signature may be verified by determining whether the second digital signature of the candidate COTP token corresponds to the second digital signature associated with the client system. The token generation circuitry 210 may use a public key associated with the user to verify the second digital signature, where the public key may be retrieved from memory 204 or other storage. The second digital signature may be verified by converting the candidate COTP token to a numerical representation. The numerical representation of the candidate COTP token may be used together with the corresponding public key and second digital signature to verify the second digital signature. If the numerical representations match, the second digital signature is verified. Otherwise, the second digital signature is not verified.

As shown by operation 524 the apparatus 200 may include means, such as processor 202, memory 204, token generation circuitry 210, or the like, for verifying the first digital signature of the candidate COTP token. In embodiments where the second authentication response comprises a first digital signature, the token generation circuitry 210 may further verify the first digital signature of the candidate COTP token. The first digital signature may be verified by determining whether the first digital signature of the candidate COTP token corresponds to the first digital signature associated with the verification system. The token generation circuitry 210 may use a public key associated with the verification system to verify the first digital signature, where the public key may be retrieved from memory 204 or other storage. The second digital signature may be verified by converting the candidate COTP token to a numerical representation. The numerical representation of the candidate COTP token may be used together with the corresponding public key and second digital signature to verify the first digital signature. If the numerical representations match, the first digital signature is verified. Otherwise, the first digital signature is not verified.

Returning now to FIG. 5B, as shown by operation 518, the apparatus 200 may include means, such as processor 202, communications hardware 206, token generation circuitry 210, or the like, for, determining if the second authentication response is verified. In an instance the second authentication response is verified, the process proceeds to operation 520. If the second authentication response is not verified, the process proceeds to operation 522.

Optionally, at operation 520, the apparatus 200 may include means, such as communications hardware 206, token generation circuitry 210, or the like, for, authorizing a computing device to perform the one or more requested actions. The apparatus 200 may provide one or more confirmation messages to one or more of user devices 110A-110N and/or auxiliary devices 116A-116N. The one or more confirmation messages may be configured with executable code such that the computing device which receives the one or more confirmation messages may automatically execute one or more actions. The one or more actions may be the one or more actions as described in the user action request. The one or more confirmation messages may be provided, for example, to the auxiliary device 116A-116N via the first channel, and/or client system 108 via the first channel or second channel. The one or more requested actions may also describe access of information, such as an account login, a transaction, modification of account data, or the like. In embodiments where the requested action is performed on another device (e.g. a device not embodied by the verification system 102) the communications hardware 206 may provide the confirmation message to another device to authorize requested actions.

In some embodiments, performance of the one or more requested action comprises completion of a transaction. For example, a user may initiate a transaction with a vendor via a user device, which may cause the apparatus 200 to receive the first authentication response via the first channel from the user device. The verification circuitry 208 may verify the first authentication response and the token generation circuitry 210 may exchange the COTP token as described in example operations above. The token generation circuitry 210 may provide information concerning the details of the transaction, such as the amount of the transaction or identity of the vendor, to provide context to the user about the transaction to be verified. The authentication request comprising the COTP token may be provided to the user device via a second channel. The verification circuitry may then receive and verify the second authentication response comprising the candidate COTP token. If the second authentication request is verified, a confirmation message authorizing the user device to complete the transaction may be send to the user device.

In some embodiments, performance of the one or more requested action comprises completion of a transaction with an automated teller machine (ATM). For example, a user may initiate a transaction with an ATM by interacting with the ATM (e.g., the auxiliary device), which may cause the apparatus 200 to receive the first authentication response via the first channel from the ATM/auxiliary device. The verification circuitry 208 may verify the first authentication response and the token generation circuitry 210 may exchange the COTP token as described in example operations above. The token generation circuitry 210 may provide information concerning the details of the transaction, such as the type of transaction (e.g., withdrawal), the amount of the transaction, etc. to provide context to the user about the transaction to be verified. The authentication request comprising the COTP token may be provided to a user device (e.g., a user cell phone) via a second channel, such as over SMS. The verification circuitry may then receive and verify the second authentication response comprising the candidate COTP token. If the second authentication request is verified, a confirmation message authorizing the ATM/auxiliary device to complete the transaction.

As shown by operation 520, the apparatus 200 may include means, such as communications hardware 206, token generation circuitry 210, or the like, for, in an instance in which the verification of the second authentication response not verified, prohibiting performance of the one or more requested actions. In the instance in which the second authentication is not verified, the token generation circuitry 210 may, via communications hardware 206, generate and provide one or more denial messages, prohibiting the performance of the one or more requested actions. The one or more denial messages may be provided, for example, to the auxiliary device 116A-116N via the first channel, and/or a user device 110A-110N via the second channel. In embodiments where the requested action is performed on another device (e.g. a device not embodied by the verification system 102) the communications hardware 206 may provide the confirmation message to another device to authorize requested actions.

In some embodiments, in an instance in which the second authentication response is not verified, the verification circuitry may further be configured to determine whether the user has violated one or more security protocols defined by a security protocol ruleset. The security protocol ruleset may be a list of rules which define acceptable parameters for an associated user. In particular, the security protocol ruleset may define one or more threshold values for a user to fail a first authentication response and/or second authentication response, a time limit within the user is prohibited from trying to reauthenticate, etc. In an instance the user is determined to violate one or more security protocols, the verification circuitry may perform one or more proactive security operations with respect to an associated user account. For example, the one or more proactive security operations may include temporarily suspending the user from authenticating for a predefined amount of time, not verifying the user until he/she changes an associated static password, etc. As such, the one or more proactive security measures may alert the user to any fraudulent authentication attempts.

Example Client System Apparatus Operations

Figure 6A:
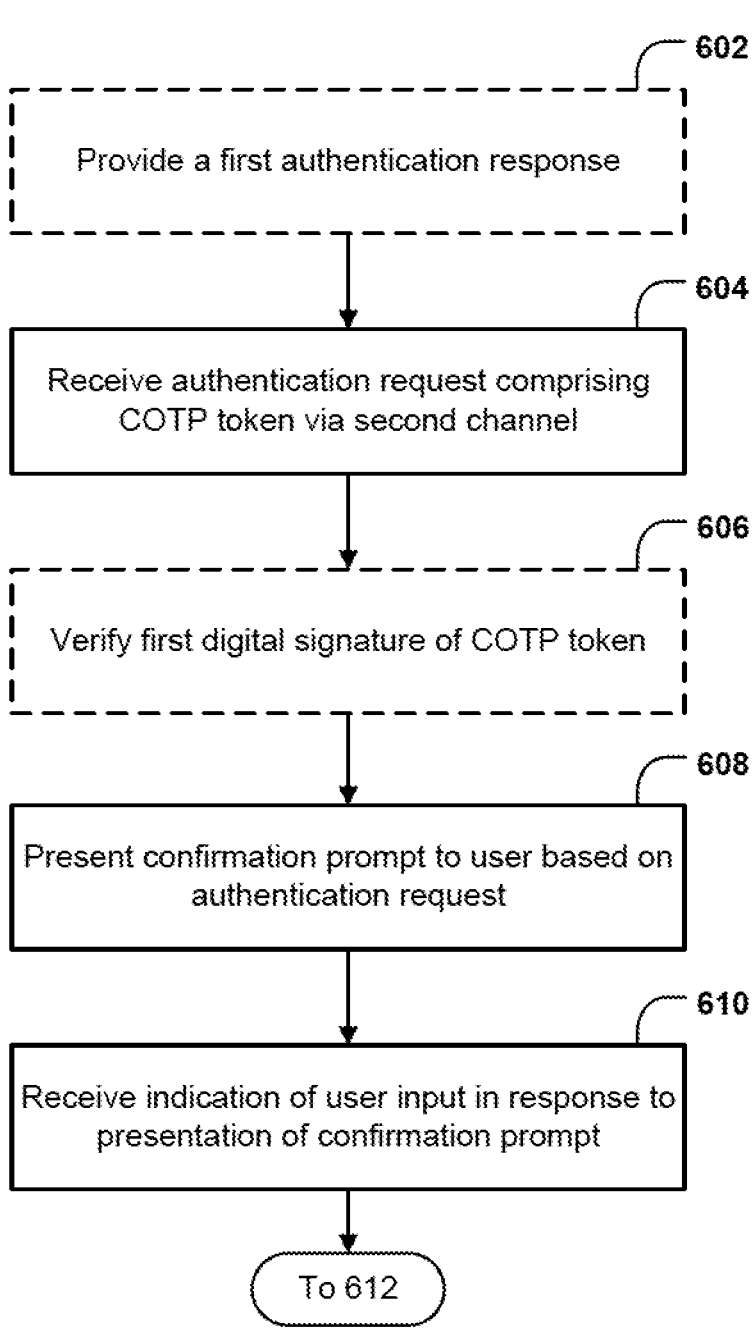
FIGS. 6A-6B illustrate example flowcharts for an authentication process using a COTP as performed by one or more user devices, in accordance with some example embodiments described herein.
Figure 6B:
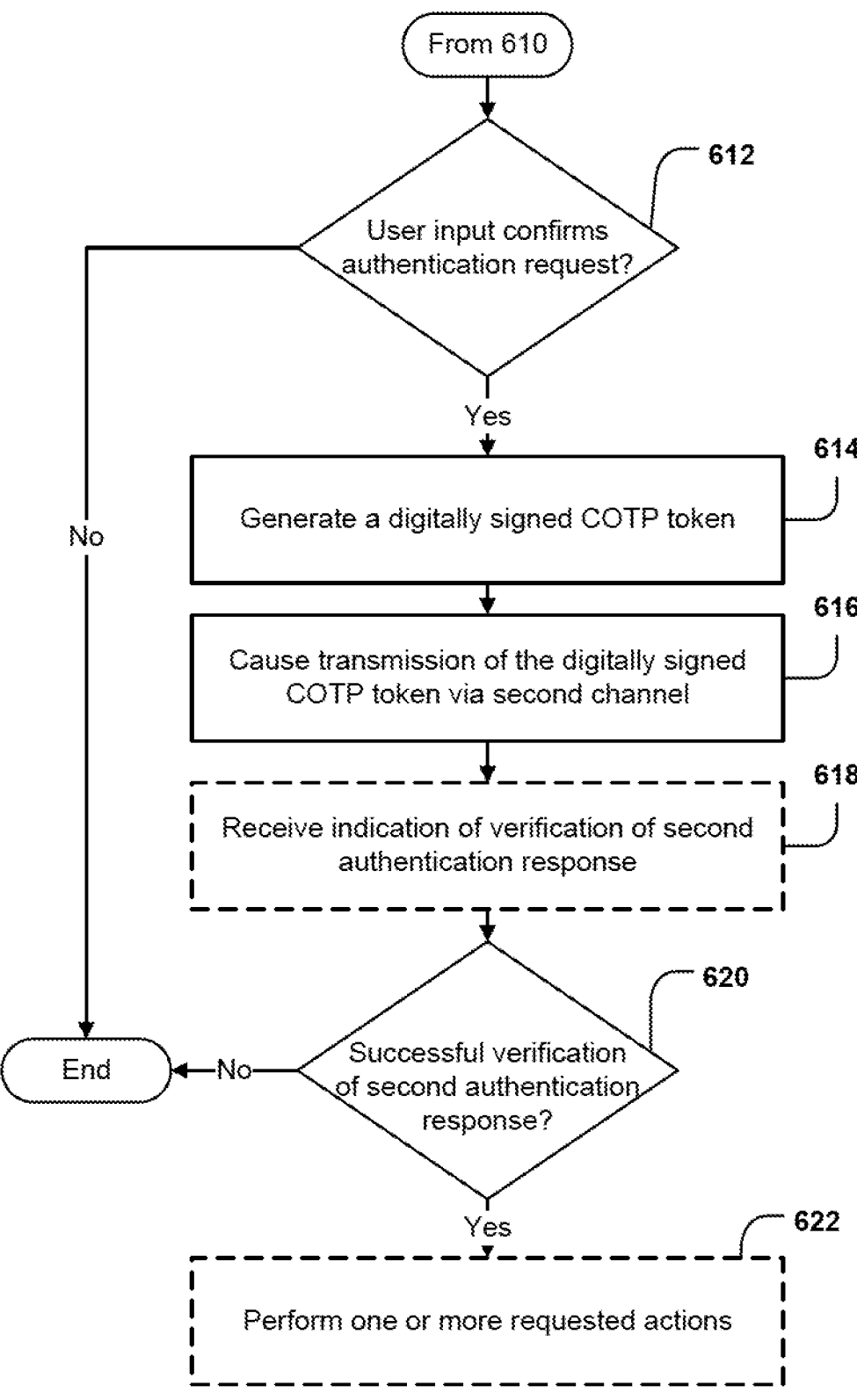

Turning to FIG. 6A-6B, example flowcharts are illustrated that contain example operations implemented by example embodiments described herein. The operations illustrated in FIGS. 6A-B may, for example, be performed by user device 110A-110N of the client system 108 shown in FIG. 1, which may in turn be embodied by an apparatus 300, which is shown and described in connection with FIG. 3. To perform the operations described below, the apparatus 300 may utilize one or more of processor 302, memory 304, communications hardware 306, cryptographic operation circuitry 308, action circuitry 310, and/or any combination thereof. It will be understood that user interaction with the client system 108 may occur directly via communications hardware 306, or may instead be facilitated by a separate auxiliary device 116A-116N, as shown in FIG. 1, and which may have similar or equivalent physical componentry facilitating such user interaction.

Turning now to FIG. 6A, example operations of the apparatus 300 are shown for authorization using a COTP. Optionally, as shown by operation 602, the apparatus 300 may include means, such as such as processor 302, communications hardware 306, or the like, for, providing a first authentication response. In some embodiments, the first authentication response may be provided to a verification system, such as system device 104. The first authentication response may be provided via a first channel. In some embodiments, the first authentication response is provided before the authentication request is received. In some embodiments, the apparatus 300 may communicate with a verification system 102 via a first channel and via a second channel, and in these embodiments the apparatus 300 may utilize communications hardware 306 to provide the first authentication response. It will be understood that in some embodiments the apparatus 300 may not provide the first authentication response, and that the first authentication response may be provided by another device, such as one of auxiliary devices 116A-116N.

In some embodiments, the apparatus 300 may identify information/data to include in the first authentication response. In some embodiments, the first authentication response must include at least a user identifier and user authentication information. The user may be identified from within a user database based on the information in the first authentication response. Additionally, the information/data may include user authentication information, which may be used to verify the user. In some embodiments, the apparatus 300 may identify the information/data to include in the first authentication response based on one or more user inputs. For example, a user may input a user identifier and a static password (e.g., user authentication information) associated with the user identifier into an application on the apparatus 300. The apparatus 300 may identify that the user identifier and static password should be included in the first authentication response.

In some, the apparatus 300 may further include a user action request. In some embodiments, the user action request may describe one or more requested actions to be performed with respect to the user. For example, a user action request may indicate the user would like to execute a 200 dollar transaction. As another example, the user action request may indicate the user would like to withdraw 500 dollars from a checking account. Alternatively, the user action request may be received separately from the first authentication request. In some embodiments, the user action request may be received from auxiliary device 116A-116N over a first channel or an alternative channel instead.

In some embodiments, the apparatus 300 may hash, encrypt, or otherwise protect at least a portion of the information described in the first authentication response. In some embodiments, the apparatus 300 may identify personally identifiable information (PII) data and/or sensitive data and protect at least this portion of data. PII data and/or sensitive data may be identified based on the associated data type (e.g., password, PIN number, etc.) and/or based on user preferences.

As shown by operation 604, the apparatus 300 includes means, such as processor 302, communications hardware 306, or the like, for receiving, via a second channel, an authentication request comprising a COTP token. The authentication request may be received from a system device 104 of the verification system 102. The COTP token is digitally signed with a first digital signature associated with a verification system 102. The communications hardware 306 may receive the authentication request from a verification system 102 via the second channel. The authentication request may comprise the COTP token, along with various headers or preambles needed to transmit the COTP token to the apparatus 300. The COTP token may be generated and may include a first digital signature as signed by a verification device of the verification system 102 and received via the second channel. The COTP token is digitally signed with a first digital signature allegedly associated with the verification system.

As described above, in some embodiments, the COTP token may comprise a COTP token header, a COTP token payload, and one or more COTP token signatures. The COTP token header may be indicative of the cryptographic algorithm used to generate the COTP token and the type of token. The COTP token payload may be indicative of at least one or more of the one or more requested actions. In some embodiments, the COTP token comprises information concerning details of the one or more requested action. In some embodiments, the COTP token may additionally include time-to-live (TTL) parameters, where a first TTL parameter may describe a user time window value in which a user may interact with the COTP token and the second TTL parameter may describes a COTP time window value in which the corresponding candidate COTP token is valid.

In some embodiments, the COTP token payload or the COTP token itself may be encrypted using a public key of the client system 108 or shared symmetric key shared between the client system 108 and the verification system 102. As such, the apparatus may be required to first decrypt the COTP token and/or COTP token payload for additional processing.

Optionally, as shown by operation 606, the apparatus 300 may include means, such as such as processor 302, memory 304, cryptographic operation circuitry 308, or the like, for, verifying the first digital signature of the COTP token. The cryptographic operation circuitry 308 may verify the first digital signature of the COTP token and may use a public key associated with the verification system 102 to verify the first digital signature, where the public key may be retrieved from memory 304 or other storage. The first digital signature may be verified by converting the COTP token to a numerical representation. The numerical representation of the COTP token may be used together with the corresponding public key and first digital signature to verify the first digital signature. If the first digital signature is not verified, the authentication request may be rejected as not valid. In an instance the first digital signature is verified, the process proceeds to operation 608.

In an instance the first digital signature is not verified, the apparatus 300 may generate one or more failure alerts. The one or more failure alerts may be provided to one or more system devices 110A-110N and/or more auxiliary devices 116A-116N. The one or more failure alerts may be indicative of the failed verification of the authentication request. In some embodiments, the verification system may resend a new authentication request comprising a new COTP token via the second channel in response to the received failure alert. In some embodiments, the apparatus 300 may additionally or alternatively display alert to a user of the apparatus 300 indicating that the authentication request was not verified. The authentication process may also be terminated by the apparatus 300.

As shown by operation 608, the apparatus 300 includes means, such as processor 302, communications hardware 306, or the like, for presenting to a user a confirmation prompt based on the authentication request. The communications hardware 306, via a screen or other output device, may present the confirmation prompt for receiving a response from the user. The confirmation prompt may display a short message to the user regarding the nature of the authentication request. The confirmation prompt may further display an indication of the remaining time for the user to respond if a TTL value is associated with the authentication request. The confirmation prompt may comprise interface options for the user to indicate an acceptance response or a rejection response to the authentication request.

In some embodiments, the confirmation prompt may display the information concerning details of the specified action to the user. The communications hardware 306, by displaying the confirmation prompt, may display certain details that allow the user to verify that the authentication request corresponds to the specified action being requested. For example, the time and date, location, and username of the user initiating the verification procedure, or details such as nature of a transaction being authorized, the type of hardware device being used or the like may be displayed on the confirmation prompt.

Figure 4:
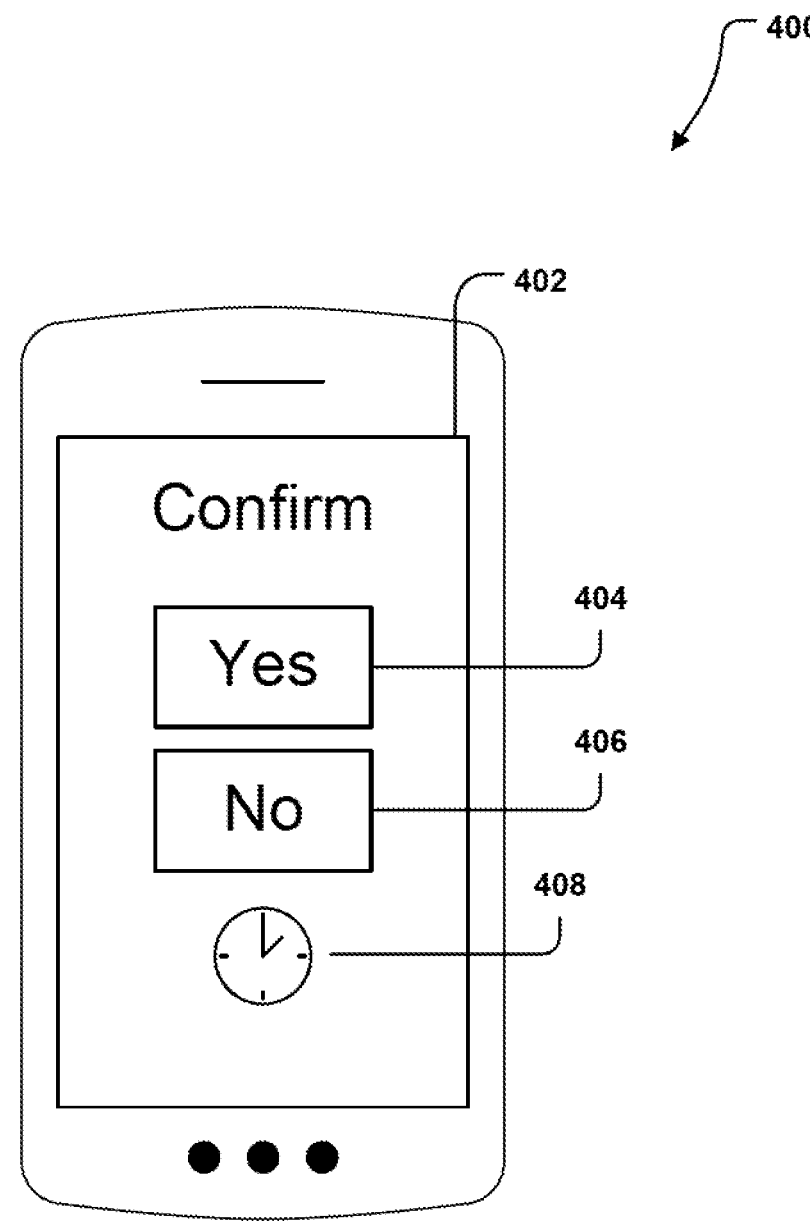
FIG. 4 provides an operational example of a confirmation prompt in accordance with some example embodiments described herein.

An operational example of the confirmation prompt is depicted in FIG. 4. As depicted in FIG. 4, an example graphical user interface (GUI) is provided that illustrates an example confirmation prompt presented to the user in response to an authentication request. As noted previously, a user may interact with the client system 108 by directly engaging with communications hardware 306 of an apparatus 300 comprising a user device 110A-110N of the client system 108. In such an embodiment, the GUI 400 shown in FIG. 4 may be displayed to a user by the apparatus 300. Alternatively, a user may interact with the client system 108 using a separate auxiliary device 116A-116N (e.g., any of auxiliary device 116A-116N, as shown in FIG. 1), which may communicate with the client system 108 via communications network 114. In such an embodiment, the GUI 400 shown in FIG. 4 may be displayed to the user by the auxiliary device 116A-116N.

The GUI 400, shown here on an apparatus 300 embodied by a mobile device, may be displayed on a touchscreen 402 in some embodiments. The confirmation prompt may be displayed on the touchscreen 402, wherein the confirmation prompt comprises an accept option 404, a reject option 406, and a timer display 408. The user may select the accept option 404 or reject option 406 via the touchscreen, or in other embodiments using a mouse, keyboard, or any other of the attached input devices of the communications hardware 306, to accept or reject the authentication request in connection with the confirmation prompt. The timer display 408 may indicate the remaining time-to-live of the authentication request. The timer display 408 may display a countdown, or give a pictorial indication of the remaining time for the user.

Returning now to FIG. 6A, operation 610, the apparatus 300 includes means, such as processor 302, communications hardware 306, or the like, for receiving an indication of user input in response to the presentation of the confirmation prompt. The user may respond to the prompt, for example, by accepting the authentication request or rejecting the authentication request with a touchscreen, other display, or other attached device of the communications hardware 306. The user may accept the authentication request to give indication that the authentication request corresponds to the specified action the user wishes to take, or the user may reject the authentication request, for example, if a potential attacker were attempting to gain control of secure information and the potential attacker caused the transmission of the authentication request. In some embodiments, the confirmation prompt may have a time limit, as indicated by a time indicator on the prompt, and a rejection response may be automatically transmitted by communications hardware 306 if a confirmation response is not received within the time limit.

Turning to FIG. 6B, as shown by operation 614, the apparatus 300 includes means, such as cryptographic operation circuitry 308, or the like, for, in an instance where the indication of the user input confirms the authentication request (as shown by decision block 612), generating a digitally signed COTP token. The cryptographic operation circuitry may generate the digitally signed COTP token and provide the digitally signed COTP token to the system device 104 via the second channel. The digitally signed COTP token may include a copy of the first signature of the COTP token. In some embodiments, the digitally signed COTP token may have additional information appended, though the original COTP token may remain unmodified to preserve the integrity of the original digital signature.

In some embodiments, the digitally signed COTP token is digitally signed with a second digital signature associated with the client system 108. The cryptographic operation circuitry 308 may generate the second digital signature using a private key associated with the asymmetric key pair of the client system 108. The private key used to sign the COTP may be pre-determined and retrieved from memory 304 or other storage, or the private key may be generated by the cryptographic operation circuitry 308. The private key may be associated with the client system 108 such that signatures generated with the private key are also associated with the client system 108. In particular, the private key of the pair of asymmetric cryptographic keys associated with the verification system may be determined and/or accessed from memory (e.g., memory 204 or other storage) and used to generate the first digital signature. Since the private key is associated with the verification system 102, that signatures generated with the private key are also associated with the verification system 102. To sign a message, the token generation circuitry 210 may cause a conversion of the COTP token to a numerical representation. The token generation circuitry 210 may further use the private key and the numerical representation of the message to compute the first digital signature. The first digital signature may be attached to the COTP token such that the COTP token and the first digital signature are transmitted together.

The second digital signature may also be generated using one or more cryptographic algorithms. In some embodiments, the second digital signature may be generated using digital signature algorithms such as RSA, DSA, or ECDSA. The second digital signature may also be generated using PQC algorithms. The second digital signature may also be generated using symmetric based algorithms, such as HMAC algorithms.

In some embodiments, the digitally signed COTP token payload or the digitally signed COTP token itself may be encrypted using one or more encryption algorithms, such as AES, such that the digitally signed COTP token is cryptographically secured. The digitally signed COTP token may be cryptographically secured by encrypting the COTP token with a public key or shared symmetric key. The public key may correspond to a private key known to be possessed by the verification system 102, or the shared symmetric key may be shared between the verification system 102 and client system 108. The encryption may make use of a pre-determined key stored in memory 304 or other storage, may make use of a key generated by the token generation circuitry 210, or may use a key received from a remote host via communications hardware 306. The digitally signed COTP token may be both encrypted and digitally signed, either by digitally signing first then encrypting, or encrypting first then digitally signing. In some embodiments, the digitally signed COTP token may be stored on a distributed ledger and/or on a blockchain.

As shown by operation 616, the apparatus 300 includes means, such as communications hardware 306, or the like, for providing a second authentication response via a second channel. The second authentication response may comprise the digitally signed COTP token. The communications hardware 306 may transmit the second authentication response to the verification system 102 via the second channel. The second authentication response may comprise the digitally signed COTP token, along with various headers or preambles needed to transmit the COTP token to a remote host, and may also comprise one or more digital signatures for additional validation of the response.

As shown by operation 618, the apparatus 300 may include means, such as communications hardware 306, or the like, for, receiving an indication of a verification of the second authentication response. The indication of verification may be received by the communications hardware 306, for example, in embodiments where the verification procedure was initiated by the apparatus 300, embodying the client system 108. In some embodiments, the indication of the verification of the second authentication response may be received via the first channel. It will be understood that in some embodiments the apparatus 300 may not receive the verification of the second authentication response, and the transmission of verification may be directed to another device, such as one of auxiliary device 116A-116N.

As shown by operation 622, the apparatus 300 may include means, such as communications hardware 306, action circuitry 310, or the like, for performing one or more requested actions based on a successful verification of the modified COTP token (as shown by decision block 620). The communications hardware 306 may receive one or more confirmation messages from the verification system 102. The one or more confirmation messages may be indicative of verification of the digitally signed COTP token. In some embodiments, the apparatus 300 may communicate with a verification system 102 via a first channel and via a second channel, and in these embodiments the action circuitry 310 may also perform the specified action pertaining to the initial transmission of identification data. It will be understood that in some embodiments the apparatus 300 may not perform the specified action, and the transmission of authorization may be directed to another device, such as one of auxiliary device 116A-116N.

FIGS. 5A-5C and 6A-6B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 7A:
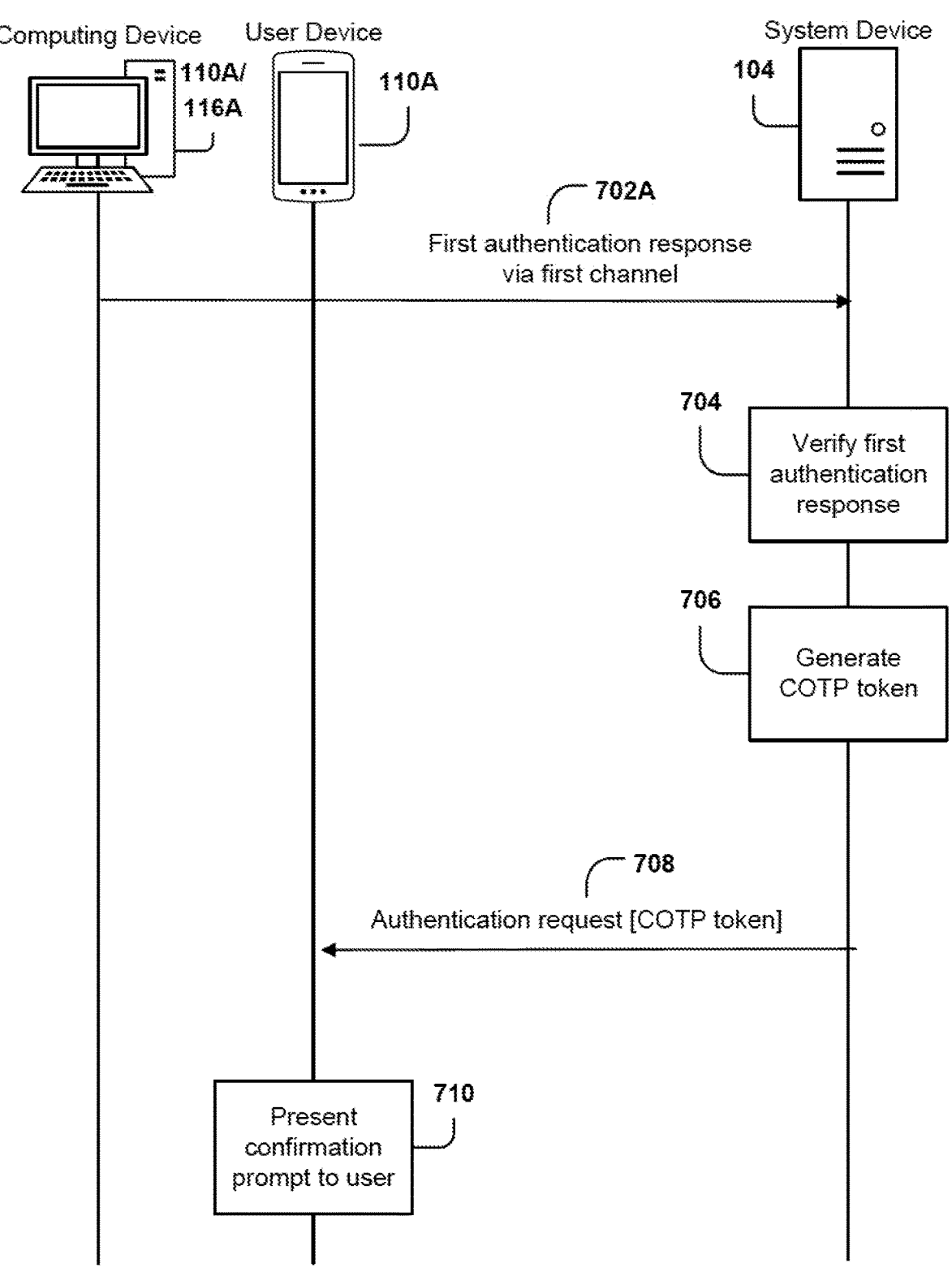
FIGS. 7A-7B illustrate an example signal diagram for an authentication process using a COTP, in accordance with some example embodiments described herein.
Figure 7B:
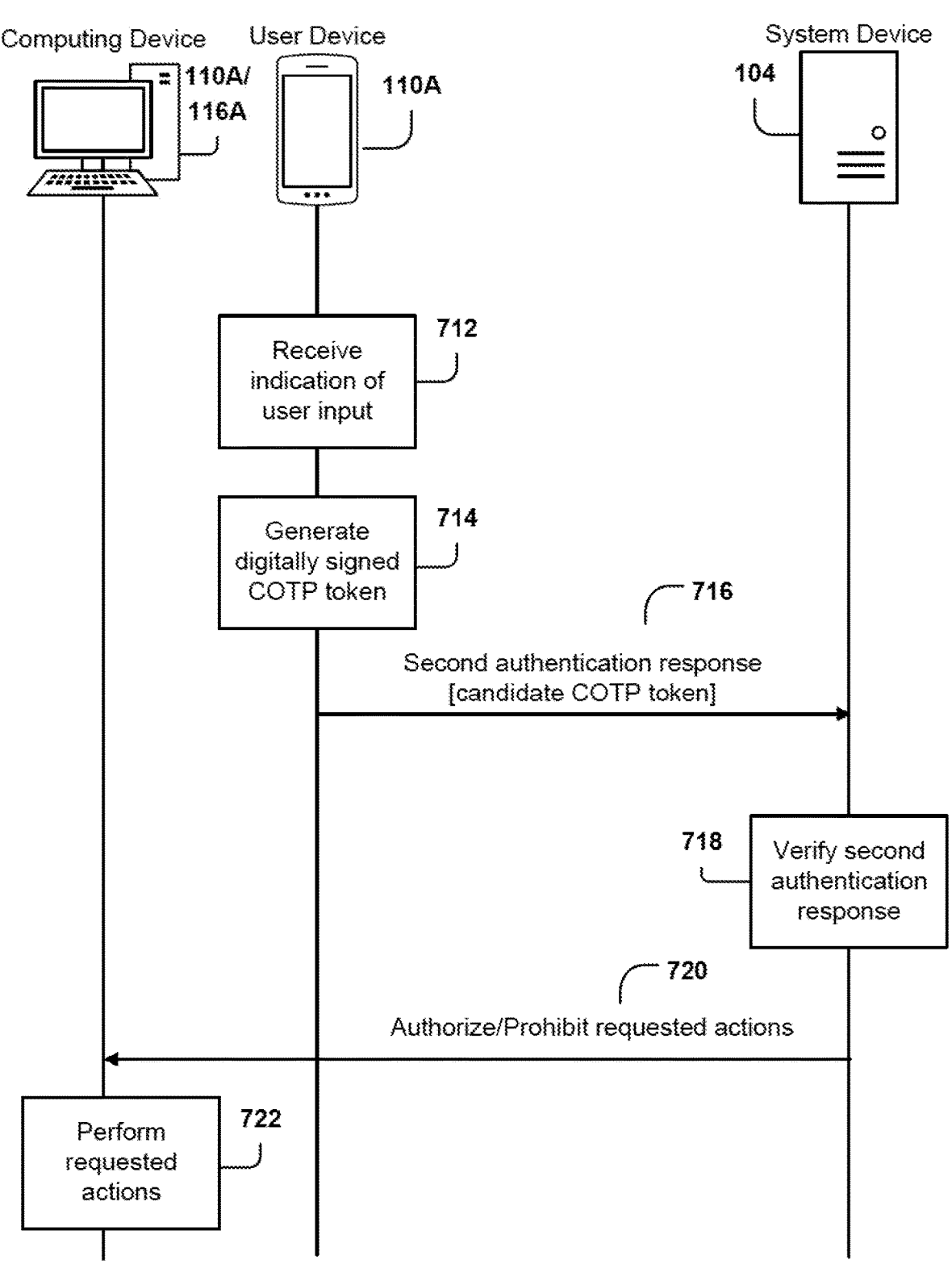

FIGS. 7A-7B show signal diagrams illustrating example operations (e.g., as described above in connection with FIGS. 5A-5C and 6A-6B) performed by components of the environment depicted in FIG. 1 to produce various benefits from example embodiments. In these figures, operations performed by a system device 104 of the verification system 102 are shown along the vertical line extending from the element labeled "system device," operations performed by a user device 110A-110N of the client system 108 are shown along the vertical line extending from the element labeled "user device." Operations performed by and/or impacting a user device 110A of the client system 108 or auxiliary device 116A, depending on the embodiment, are indicated using the vertical line extending from the element labeled "computing device." Operations impacting multiple devices, such as data transmissions between the devices, are shown using arrows extending between these lines. Generally, the operations are ordered temporally with respect to one another. However, it will be appreciated that the operations may be performed in other orders from those illustrated herein.

Turning first to FIG. 7A, at operation 702, the verification system 102 may receive a first authentication response associated with the user via a first channel. The first authentication response may be provided by a user device of user devices 110A-110N or an auxiliary device of auxiliary devices 116A-116N. At operation 704, the system device 104 may verify the first authentication response based on stored data associated with the user. At operation 706, the system device 104 may generate a COTP token, wherein the COTP token is digitally signed with a first digital signature associated with the verification system 102. At operation 708, the system device 104 may cause transmission via a second channel of an authentication request comprising the COTP token, and the user device 110A may receive the authentication request comprising the COTP token, wherein the COTP token is digitally signed with a first digital signature associated with the verification system 102. At operation 710, the user device 110A may present to a user a confirmation prompt based on the authentication request.

Continuing now to FIG. 7B, at operation 712, the user device 110A may receive an indication of user input in response to the presentation of the confirmation prompt. At operation 714, the user device 110A may generate a digitally signed COTP token. At operation 716, the user device 110A may cause transmission of a second authentication response comprising the digitally signed COTP token via the second channel, and the system device 104 may receive the second authentication response comprising the digitally signed COTP token/candidate COTP token. At operation 718, the system device 104 may verify the second authentication response. At operation 720, the system device 104 may authorize the performance of a specified action by a user device of user devices 110A-110N or an auxiliary device of auxiliary devices 116A-116N. At operation 722, the user device 110A or auxiliary device 116A may perform the requested actions.

As described above, example embodiments provide methods and apparatuses that enable improved authentication by using the exchange of a COTP via a second channel. By eliminating the need to copy a password from a second OTP channel to another channel, example embodiments save users time and avoiding the frustration of manually copying or entering a unique OTP. Furthermore, COTP based authentication methods improve upon legacy OTP authentication systems by cryptographically protecting COTP tokens and thereby increasing the security of such authentication methods. By verifying COTP tokens based on one or more digital signatures, verification systems may check whether a COTP token has been intercepted or otherwise compromised, thereby improving upon traditional OTP authentication systems. Finally, example embodiments may enable organizations to implement MFA and/or 2FA more widely. By making two-factor authentication less burdensome for users and thus improving the user experience, example embodiments enable organizations to implement two-factor authentication using the COTP token without negatively impacting user experience.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

receiving, by communications hardware of a verification system and via a first channel, a first authentication response associated with a user, wherein the first channel links the verification system and a first user device, wherein the first authentication response is associated with one or more requested actions to be performed with respect to the user;

performing, by verification circuitry of the verification system, one or more first verification operations on the first authentication response;

generating, by token generation circuitry of the verification system and in response to verification of the first authentication response, a cryptographic one-time-passcode (COTP) token, wherein the COTP token is digitally signed with a first digital signature associated with the verification system, wherein the COTP token comprises a COTP token payload indicative of the one or more requested actions;

providing, by the communications hardware and via a second channel, an authentication request comprising the COTP token, wherein the second channel links the same verification system and a second user device, wherein providing the authentication request causes display of an indication of the one or more requested actions on the second user device;

receiving, by the communications hardware and from the second user device via the second channel, a second authentication response comprising a candidate COTP token; and performing, by the verification circuitry, one or more second verification operations on the second authentication response based on the received candidate COTP token.

2. The method of claim 1, further comprising:

receiving, by the communications hardware, a user action request, wherein the user action request is indicative of one or more requested actions to be performed with respect to the user; and in an instance in which the second authentication response is verified, authorizing, by the verification circuitry, a computing device to perform the one or more requested actions.

3. The method of claim 1, further comprising:

receiving, by the communications hardware of the verification system, a user action request, wherein the user action request is indicative of one or more requested actions to be performed with respect to the user; and in an instance in which the second authentication response is not verified, prohibiting, by the verification circuitry, a computing device to perform the one or more requested actions.

4. The method of claim 3, further comprising:

in an instance in which the second authentication response is not verified, determining, by the verification circuitry, whether the user has violated one or more security protocols defined by a security protocol ruleset; and in an instance the user is determined to violate the one or more security protocols, performing, by the verification circuitry, one or more proactive security operations with respect to an associated user account.

5. The method of claim 1, wherein performing the one or more second verification operations on the second authentication response comprises:

verifying, by the verification circuitry, a third digital signature of the candidate COTP token based on the first digital signature associated with the verification system;

verifying, by the verification circuitry, whether a fourth digital signature of the candidate COTP token corresponds to a fifth digital signature associated with a user device associated with the received second authentication response; and in an instance both the third digital signature and the fourth digital signature are verified, verifying the second authentication response.

6. The method of claim 5, further comprising:

in an instance in which the fourth digital signature fails to correspond to the fifth digital signature associated with the user device, generating one or more authentication failure alerts.

7. The method of claim 1, wherein:

the COTP token comprises a first time-to-live (TTL) parameter and a second TTL parameter, the first TTL parameter describes a user time window value in which a user may interact with the COTP token, and the second TTL parameter describes a COTP time window value in which the corresponding candidate COTP token is valid.

8. The method of claim 1, further comprising:

generating, by the token generation circuitry, the first digital signature according to one or more cryptographic algorithms.

9. The method of claim 8, wherein the one or more cryptographic algorithms includes one or more of a Rivest-Shamir-Adleman algorithm (RSA), a digital signature algorithm (DSA), an elliptic curve digital signature algorithm (ECDSA), a post-quantum cryptography (PQC) algorithm, or a hash-based message authentication (HlVlAC) algorithm.

10. The method of claim 1, wherein generating the COTP token further comprises:

receiving, by the communications hardware of the verification system, a user action request from a first computing device, wherein the user action request is indicative of the one or more requested actions to be performed with respect to the user;

generating, by the token generation circuitry, the COTP token payload, wherein the COTP token payload is at least indicative of one or more of the one or more requested actions; and generating, by the token generation circuitry, the COTP token, wherein the COTP token comprises the COTP token payload.

11. The method of claim 10, further comprising:

encrypting, by the token generation circuitry, the COTP token payload using one or more encryption algorithms.

12. The method of claim 1, further comprising:

encrypting, by the token generation circuitry, the COTP token using one or more encryption algorithms.

13. The method of claim 1, further comprising:

storing, by the token generation circuitry, the COTP token on a distributed ledger.

14. The method of claim 1, wherein generating the COTP token further comprises:

determining, by the token generation circuitry, a randomizer value; and generating, by the token generation circuitry, the COTP token based in part on the randomizer value.

15. The method of claim 1, wherein data belonging to the COTP is not displayed by the first user device or the second user device.

16. An apparatus comprising:

communications hardware configured to:

receive, via a first channel, a first authentication response associated with a user, wherein the first channel links the apparatus and a first user device, wherein the first authentication response is associated with one or more requested actions to be performed with respect to the user, provide, via a second channel, an authentication request comprising a COTP token, wherein the second channel links the same apparatus and a second user device, wherein providing the authentication request causes display of an indication of the one or more requested actions on the second user device, and receive, via the second channel, a second authentication response from the second user device comprising a candidate COTP token;

verification circuitry configured to:

perform one or more first verification operations on the first authentication response, and perform one or more second verification operations on the second authentication response based on the received candidate COTP token; and token generation circuitry configured to:

generate, in response to verification of the first authentication response, the cryptographic one-time-passcode (COTP) token, wherein the COTP token is digitally signed with a first digital signature associated with the apparatus, wherein the COTP token comprises a COTP token payload indicative of the one or more requested actions.

17. The apparatus of claim 16, wherein:

the communications hardware is further configured to:

receive a user action request, wherein the user action request is indicative of one or more requested actions to be performed with respect to the user; and the verification circuitry is further configured to:

in an instance in which the second authentication response is verified, authorize a computing device to perform the one or more requested actions.

18. The apparatus of claim 16 wherein:

the communications hardware is further configured to:

receive a user action request, wherein the user action request is indicative of one or more requested actions to be performed with respect to the user; and the verification circuitry is further configured to:

in an instance in which the second authentication response is not verified, prohibiting, a computing device to perform the one or more requested actions.

19. The apparatus of claim 16, wherein the verification circuitry is further configured to:

in an instance in which the second authentication response is not verified, determine whether the user has violated one or more security protocols defined by a security protocol ruleset; and in an instance the user is determined to violate the one or more security protocols, perform one or more proactive security operations with respect to an associated user account.

20. The apparatus of claim 16, wherein the verification circuitry is further configured to, when performing the one or more second verification operations on the second authentication response:

verify a third digital signature of the candidate COTP token based on the first digital signature associated with the apparatus;

verify whether a fourth digital signature of the candidate COTP token corresponds to a fifth digital signature associated with a user device associated with the received second authentication response; and in an instance both the third digital signature and the fourth digital signature are verified, verify the second authentication response.

21. A computer program product, the computer program product comprising at least one non-transitory computer-readable storage medium storing software instructions that, when executed, cause an apparatus to:

receive, via a first channel, a first authentication response associated with a user, wherein the first channel links the apparatus and a first user device, wherein the first authentication response is associated with one or more requested actions to be performed with respect to the user;

perform one or more first verification operations on the first authentication response;

generate, in response to verification of the first authentication response, a cryptographic one-time-passcode (COTP) token, wherein the COTP token is digitally signed with a first digital signature associated with the apparatus, wherein the COTP token comprises a COTP token payload indicative of the one or more requested actions;

provide, via a second channel, an authentication request comprising the COTP token, wherein the second channel links the same apparatus and a second user device, wherein providing the authentication request causes display of an indication of the one or more requested actions on the second user device;

receive, via the second channel, a second authentication response from the second user device comprising a candidate COTP token, wherein the COTP token is digitally signed with a first digital signature associated with the apparatus; and perform one or more second verification operations on the second authentication response based on the received candidate COTP token.

* * * * *